US009247719B1

(12) United States Patent
Bennett et al.

(10) Patent No.: US 9,247,719 B1
(45) Date of Patent: Feb. 2, 2016

(54) FLYING ANIMAL FEEDER CONTROL, MONITORING, AND REPORTING SYSTEM

(71) Applicants: Teddy Leland Bennett, Kirkland, WA (US); Maria Ivanova Bennett, Kirkland, WA (US)

(72) Inventors: Teddy Leland Bennett, Kirkland, WA (US); Maria Ivanova Bennett, Kirkland, WA (US)

( * ) Notice: Subject to any disclaimer, the term of this patent is extended or adjusted under 35 U.S.C. 154(b) by 0 days.

(21) Appl. No.: 14/517,913

(22) Filed: Oct. 19, 2014

(51) Int. Cl.
*A01K 5/00* (2006.01)
*A01K 39/02* (2006.01)
*A01K 7/00* (2006.01)

(52) U.S. Cl.
CPC .............. *A01K 39/0206* (2013.01); *A01K 5/00* (2013.01); *A01K 7/00* (2013.01)

(58) Field of Classification Search
CPC ..... A01K 7/027; A01K 5/0225; A01K 39/00; A01K 39/02; A01K 39/0206
USPC ........................................ 119/51.5
See application file for complete search history.

(56) References Cited

U.S. PATENT DOCUMENTS

| | | | | |
|---|---|---|---|---|
| 6,062,166 | A * | 5/2000 | Macrina | 119/51.11 |
| 6,901,882 | B2 | 6/2005 | Kuelbs | |
| 7,017,521 | B2 * | 3/2006 | Kuelbs | 119/452 |
| 7,540,262 | B2 * | 6/2009 | Kuelbs | 119/452 |
| 7,748,347 | B2 | 7/2010 | Richmond | |
| 8,146,535 | B1 * | 4/2012 | Neumann | 119/73 |
| 8,176,874 | B2 * | 5/2012 | Reusche et al. | 119/73 |
| 8,925,485 | B2 * | 1/2015 | Pu et al. | 119/51.02 |
| 2005/0257749 | A1 * | 11/2005 | Kuelbs | 119/57.8 |
| 2006/0118055 | A1 * | 6/2006 | Kuelbs | 119/57.8 |
| 2007/0295277 | A1 * | 12/2007 | Kin et al. | 119/51.02 |
| 2009/0020074 | A1 * | 1/2009 | Harman | 119/51.11 |
| 2010/0199918 | A1 * | 8/2010 | Reusche et al. | 119/74 |
| 2010/0206237 | A1 * | 8/2010 | Reusche et al. | 119/73 |
| 2011/0139076 | A1 * | 6/2011 | Pu et al. | 119/51.02 |
| 2012/0192796 | A1 | 8/2012 | Saunders et al. | |

OTHER PUBLICATIONS

Eli Bridge, "A low-cost radio frequency identification device for ornithological research", Journal of Field Ornithology 82(1):52-59, 2011.
TMF, "Solar Hummingbird Feeder", Feb. 11, 2014, URL: https://www.quirky.com/invent/944278/action/vote/query/view=trending&categories=all.

* cited by examiner

*Primary Examiner* — Kristen C Hayes
(74) *Attorney, Agent, or Firm* — Ted L. Bennett

(57) ABSTRACT

Powered flying animal sustenance-dispensing stations described herein may be capable of supplying food or water to flying animals, of controlling electrical loads that prevent liquid sustenance freeze-up or overheating and other loads that help sanitize the sustenance, that illuminate the station, or that generate sounds; of acquiring and processing data from a variety of sensors both internal and external to the station, and of reporting both raw and processed data. They may also be capable of wirelessly communicating with other stations, or with non-station devices over wireless communication networks to facilitate reporting of sensor and other data, and to support configuration of station controller operational and reporting behavior. Station configurations may facilitate monitoring of video and audio activity of nearby animals, tagged animals visiting the station, weather conditions in the station's vicinity, station food or water supply levels, and other parameters according to the sensors of a given embodiment.

20 Claims, 19 Drawing Sheets

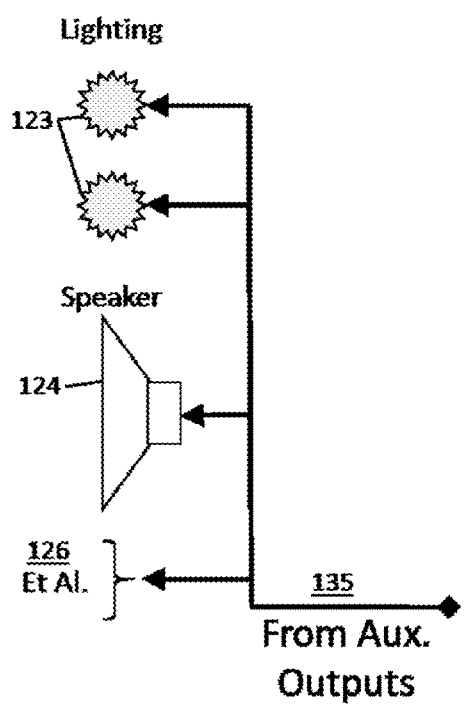
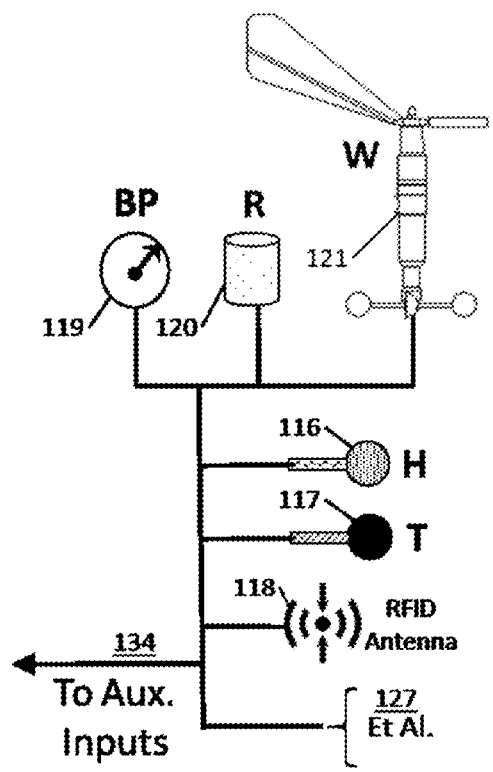
FIG. 1B  FIG. 1C

Green Light = Power ON

122

Red Light = Heater/Cooler ON
Flashing Red Light = Low Food

FLYING ANIMAL FEEDER CONTROL, MONITORING, AND REPORTING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND

People often place feeders in their backyards to attract hummingbirds, songbirds, and other flying animals (e.g., bats, moths, butterflies) to identify them, observe them in close proximity, and experience their presence when outdoors. These highly desirable animals most often migrate with the seasons and as such, are typically thought of as summer flyers but some species of birds (e.g., chickadee, sparrow) commonly overwinter in the higher latitudes where winter climates can include freezing temperatures and snowfall. During periods of snow and freezing temperatures, the seeds, nuts, and insects upon which overwintering birds rely may become covered by snow or ice and drinking water sources may freeze over—leaving them with diminished availability of sustenance essential to their very survival. Of those who put out seed and water sustenance for flying animals, many neglect to check and refill their feeders and even those that do so regularly may find it burdensome or impossible to keep dry food accessible in the presence of snow, and maintain a constant supply of liquid water during freezing temperatures.

Though most hummingbird species are migratory, the Anna's hummingbird can be found year-round along the Pacific coast as far north as British Columbia, Canada. Additionally, members of migrating hummingbird species may arrive early in the season to claim territory for attracting a mate, or stay late—being caught off guard by an early season storm. Younger birds may find themselves trapped in winter areas due to their inexperience with migration and hummingbirds of any age may be victims of storms or other factors that push them off course into winter's path. When temperatures drop, hummingbirds are vulnerable to the scarce supply of insects and nectar that are so vital to their survival.

Backyard feeders can be life-savers for hummingbirds that find themselves in winter climates but the nectar (sugar water) in the feeders may freeze—depriving hummingbirds of a food source on which they rely. Though bird enthusiasts (birders) may take measures to keep nectar within their feeders from freezing (e.g., bringing them in at night, increasing sugar content, using elaborate lamps or heat tape), they may miss the fact that a feeder is empty or the nectar within frozen, and one day without this food supply may spell doom for the bird that is living in sub-freezing temperatures. Some birders may keep two feeders and exchange the freezing one with a warm one that has been kept indoors—sometimes several times a day, but this scheme is difficult to maintain for those at work or on vacation. During the summer months, flying animal enthusiasts may not be aware when high temperatures have spoiled the liquid sustenance within their feeders—possibly driving birds away from their feeders or even making them ill.

SUMMARY

This summary is provided to introduce simplified concepts concerning flying animal sustenance control, monitoring, and reporting stations & systems, which are further described below in the Detailed Description. This summary is not intended to identify key or essential features of the claimed subject matter, nor is it intended for use in determining the scope of the claimed subject matter. Furthermore, the claimed subject matter is not limited to implementations that solve any or all disadvantages noted in any part of this disclosure.

Disclosed herein are embodiments of flying animal sustenance stations (commonly referred to as birdfeeders) that hold liquid sustenance for consumption by birds (commonly used for feeding hummingbirds and providing water to songbirds) and other flying animals (e.g., bats, moths), having control and monitoring systems that may heat the liquid food as necessary to prevent the food from freezing in cold weather; that may cool the liquid food as necessary to retard bacterial, fungal, and other growth within the food in warm weather; that may kill bacteria and other biological agents growing within the liquid sustenance; that may report power, function, and food status; that may predict when the sustenance supply is likely to be depleted; that may communicate live video and audio of activity surrounding the feeder; that may gather and report statistics of birds and food consumption; that may be configured to generate alarms when specified conditions are met; that may have feeder lighting configurable by the user to turn on and off when desired; that may read and store ID tag information attached to an animal and report the information and time it was present; that may drive electrical loads (e.g., lights, speakers) external to the station; that may receive data from sensors external to the station (e.g., temperature, humidity, barometric pressure, wind speed, wind direction) for reporting purposes; that may receive and that may bi-directionally communicate information wirelessly with other stations and devices as necessary for configuration by a user, and control, monitoring, and reporting information to a user.

The foregoing and other objects, features, and advantages of the inventions will become more apparent from the following detailed description, which proceeds with reference to the accompanying figures.

BRIEF DESCRIPTION OF THE DRAWINGS

To facilitate understanding of the advantages of the invention, a more complete description of the invention briefly described in the summary above, is given in the detailed description with reference to specific embodiments illustrated in the drawings listed below. These drawings depict embodiments of the invention and should not be considered as limiting in its scope. All sustenance stations depicted in drawings herein are illustrated in cylindrical form, but may be embodied in any sizes, shapes, and forms for aesthetic and/or functional purposes that suit the needs of other embodiments. The invention will be described and explained in detail using specific references to elements depicted in the accompanying drawings.

The detailed description relies on reference to the accompanying figures. The left-most digit(s) of a figure reference number identifies the figure in which the reference number first appears. The use of the same reference numbers in dif

FIG. 1B depicts an example of flying animal liquid-sustenance station electrical loads driven by auxiliary outputs from the controller.

FIG. 1C depicts an example of flying animal liquid-sustenance station external sensors connected to auxiliary inputs of the controller.

DETAILED DESCRIPTION

Overview

Flying animal sustenance stations are used throughout the world in urban and suburban settings at private residences, office parks, zoological parks/gardens, in wildlife refuges, and in the wilderness at large. In all settings the invention disclosed herein helps prevent liquid sustenance freeze-up, overheating, and bacterial growth, while facilitating monitoring of sustenance station status, animal identification, animal activity near the station, and weather conditions over the internet or other wireless communication means. Remotely-located stations may connect to the internet via cellular radio and stations located in range of local area network (LAN) or wide area network (WAN) wireless access points (APs), may connect to the internet via compatible radios and protocols (e.g., 802.11, Bluetooth). Users may directly connect to stations within wireless communication range via a mobile device (e.g., smartphone, tablet, laptop) application, using 802.11, Bluetooth, or other short-range wireless radios and protocols.

Flying animal enthusiasts using the invention may be able to view & record live video & audio feeds of birds and other animal action around their sustenance stations, check the level of the sustenance supply, the sustenance and air temperatures, current weather conditions at the station, statistics of activities at the station over time, change alarm and other settings, see information from ID tags carried by animals near the station, etc. from their mobile device (e.g., smartphone, tablet, laptop) application, an online web application, or an application hosted on a local server or on the sustenance station controller itself. Ornithologists, chiropterologists, lepidopterologists, and zoologists may use the invention to collect data acquired from individual stations, or multiple stations locally networked together where one or more stations aggregate sensor data, and serve as monitoring, reporting, and configuration nodes for locally-networked stations, through the node's wireless internet (or other external network or device) connection. The audio, visual, ID tags, and other sensor data gathered can provide researchers with valuable information for studying flying animal populations, migrations, behavior and other aspects of their lives that may help guide efforts to protect threatened, endangered, and stressed species populations. Data acquired by amateur-operated stations may be shared with researchers to facilitate their investigations of flying animal populations by increasing the amount of data at their disposal for analysis.

Example Implementations

Figure 1A:
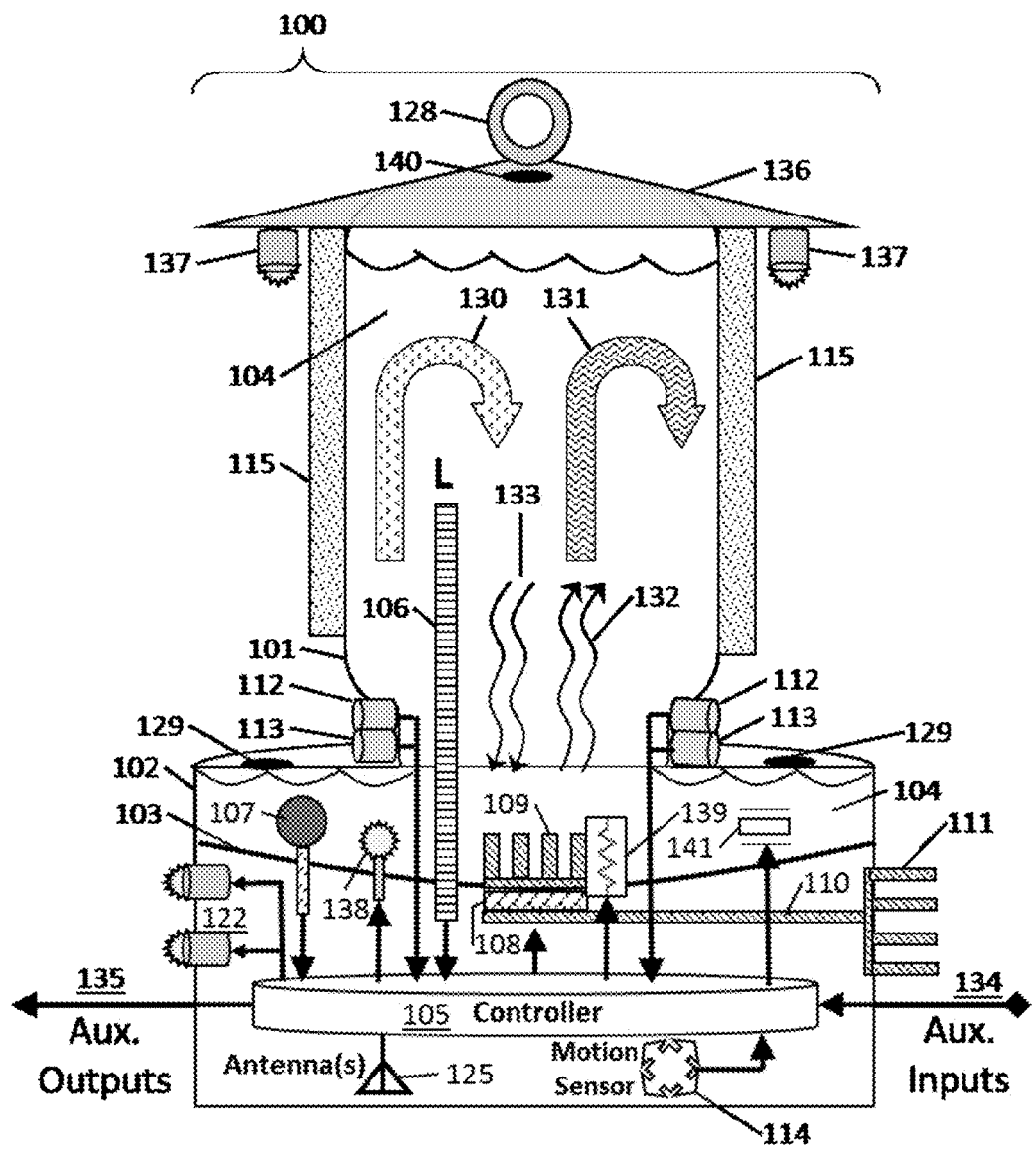
- FIG. 1A depicts a component schematic of a flying animal liquid-sustenance station control, monitoring, and reporting station.

FIG. 1A shows, in schematic form that is not drawn to scale, a non-exhaustive collection of components that may be incorporated into a flying-animal liquid sustenance station 100, a key apparatus of the control, monitoring, and reporting system. Typical flying-animal liquid sustenance stations may dispense water, sugar-water, or other liquid 104 sustenance, and comprise a storage vessel 101 for storing the liquid 104 and a feeding tray 102 into which liquid 104 from the storage vessel 101 drains. The feeding tray 102 is removably attached to the storage vessel 101 (via e.g., threaded coupling, snap on & releasable fitting) to facilitate cleaning and liquid sustenance 104 replenishment, and has one or more openings 129 positioned around the top surface from which the animals access the sustenance for consumption.

Typically attached (fixedly or removably) to the top of the storage vessel 101 is a cap 136 with at least one attachment ring 128 fixedly or removably attached to the cap 136, that enables the station 100 to be attached to a rope, hook, chain, cable or other means and suspended from an overhead support such as a porch ceiling, eave, tree branch, pole with support arm, etc. The cap 136 may have a hole 140 positioned in the area of the attachment ring 128, through which electrical wiring carrying power and other electrical signals may be routed to and from the station 100 as may be required for specific embodiments or station mounting configurations. The cap 136 may also be fitted with electrical loads such as station 100 area illuminating lamps 137, or other electrical loads such as, but not limited to, speakers 307, or fitted with sensors such as, but not limited to, audio 112 and imaging 113 sensors depicted mounted to the cap 136 in FIG. 3A.

As further illustrated in FIG. 1A, the feeding tray 102 comprises two main chambers, upper and lower, divided substantially horizontally by a sealing barrier 103 that prevents the liquid 104 in the upper chamber from escaping into the lower chamber containing the station controller 105 and other electrical components and associated circuitry. The sealing barrier 103 may be flat, curved, or otherwise shaped to accommodate the attachment of sensors and electrical loads at various locations to optimize their respective functions. The electrical loads and sensors shown in the feeding tray 102 are positioned for illustrative purposes only and may be placed as appropriate for the size, geometries, and other requirements specific to different station embodiments. The types and quantities of sensors and electrical loads shown are for descriptive purposes only and not limiting in any way to the types and quantities of sensors and electrical loads used for other embodiments.

A temperature (T) sensor 107 (e.g., thermistor, infrared (IR)), a thermoelectric cooling and heating device (TEC) 108 (e.g., Peltier device), and an optional resistive (R) heater 139 are electrically coupled to a station controller 105 that attempts to maintain a specified liquid temperature or temperature range setting by determining the temperature of the liquid 104 based on input data received from T sensor 107, and applying or removing power to the TEC 108 or resistive heater 139 as necessary. The T sensor 107 is located above the sealing barrier 103 and sensor types best suited to direct contact (e.g., thermistor) may be immersed in liquid 104 for optimum thermal coupling, or if a non-contact sensor (e.g., IR) it may be positioned above the surface of liquid 104 at some point (not shown) under the top surface of the feeding tray 102. The TEC 108 is ideally located in the center of the sealing barrier 103, with the top side thermally coupled to the liquid 104 either directly or with heat sink 109 thermally bonded to the top surface of the TEC 108 and immersed in liquid 104 to provide improved temperature transfer between TEC 108 and liquid 104. Thermally bonded to the lower side of the TEC 108 is a thermally conductive material (e.g., aluminum) 110 that extends substantially to the edge of the feeding tray 102 where it is thermally bonded to a heat sink 111 that is substantially exposed to ambient air.

The controller 105 may operate the TEC 108 in a mode that moves heat from the upper surface to the lower surface (cooling mode), or in a mode that moves heat from the lower surface to the upper surface (heating mode), by reversing the polarity of the voltage output driving the TEC 108 electrical load. Although heat sink 109 is shown attached to the top surface of TEC 108 to increase the surface area for improved thermal transfer to and from liquid 104, it may not be necessary for use in designs incorporating TECs with large surface areas. The ability of TECs to transfer heat from one surface to the other diminishes as the temperature difference between the two surfaces increases and as such, it may be beneficial to use an efficient thermal conductor 110 to optimize transfer of heat from the lower surface of TEC 108 to the heat sink 111 exposed to ambient air. Typical single-stage TECs (e.g., TEC1-12703) produce a maximum temperature difference of about 70° C. between their upper and lower surfaces and their ability to maintain the liquid 104 above freezing temperatures in extremely cold winter environments may be challenged. In embodiments where a station 100 may be used in such conditions, R heater 139 may be bonded to or otherwise immersed in liquid 104 and powered solely or together with the TEC 108 to provide sufficient heat to keep the liquid 104 from freezing. To further help keep the liquid 104 from freezing, insulation 115 may be applied to (e.g., a sleeve that slides over), or be an integral part of the storage vessel 101 and the underside of the cap 136 to reduce heat loss from the liquid 104. Insulation 115 also serves to reduce heat transfer to the liquid 104 when the station is exposed to high-temperature environments. Insulation (e.g., compartments filled with air or insulating material) may also be incorporated into the outer perimeters of the feeding tray 102 and beneath the sealing barrier 103 to aid in temperature regulation of the liquid 104. The use of transparent material for insulation (e.g., double pane glass or plastic) 115 around the storage vessel 101 may be preferred by a station owner but decorative opaque insulating materials may also find favor. Glass or plastic storage vessels 101 not covered with insulation 115 may be coated with a low emissivity (Low E) material to reduce solar radiative heating of the liquid 104, but may have little effect on high ambient temperature environments.

It is not necessary to locate the TEC 108 and bonded heat sink 109 (if used) in the center of the sealing barrier 103 as shown, but doing so allows for optimal convection currents of the liquid 104 when the TEC 108 is operated in cooling mode, and also when operated in heating mode. When the TEC 108 top surface is cooler than the surrounding liquid 104, a convection current in the liquid 104 forms as the liquid 104 above the TEC 108 cools and its increased density causes it to sink 133 and forces the warmer, less dense liquid 104 to rise along the outer areas of the storage vessel 101, in the general cooling-mode circulation pattern 130 depicted. Conversely, when the TEC 108 top surface is warmer than the surrounding liquid 104, the liquid warming above the TEC rises 132 forming a general warming-mode circulation pattern 131 as depicted.

A parallel conductive strip capacitive or resistive liquid level sensor 106 is shown immersed in the liquid 104 above the sealing barrier 103, the capacitance or resistance of which is measured by the controller 105. An alternative type of liquid level sensing comprises a float that floats on the surface of the liquid 104, that is attached to a line that winds around a lightly spring-loaded spool attached to the sealing barrier 103 so that as the liquid level drops, the spool reels in the line and a shaft position encoder (e.g., potentiometer, optical) provides a signal to the controller 105 that is proportional to the amount of line on the spool and correspondingly, the level of the liquid 104. Another means of measuring the level of the liquid 104 uses a force transducer located at the station mounting point that is read by the controller 105 to determine the weight of the feeder. Other sensors or techniques may be employed for level sensing. The level sensed may be may span to the full capacity of the storage vessel 101, to the capacity of the feeding tray 102, or anywhere between. Other embodiments may implement level sensing with multiple sensors such as, but not limited to, an external capacitive sensor to detect fluid level in the storage vessel 101 and a float level switch in the feeding tray 102 to signal when the liquid drops below a predetermined level.

Flying-animal liquid sustenance stations 100 are typically visited for sustenance by numerous flying animals that may be from local or migrating populations. Flying animals carrying viral or bacterial infections that feed at the station may leave infectious agents transmitted through direct contact with the liquid 104 in the feeder as they draw sustenance through feeding station ports 129, or by other means. To prevent or retard the growth of infectious agents in the liquid 104, the station 100 may be equipped with one or more ultraviolet (UV) light emitters 138, ideally light emitting diodes (LEDs), that emit UV light having a wavelength at or shorter than 290 nanometers (nm). Research by NASA and others show that UV light of these wavelengths has a germicidal effect and as such, the use of such UV lights may help prevent or reduce the spread of infectious agents among animals drawing sustenance from the station.

To avoid the possibility of potentially harmful UV exposure of a flying animal's proboscis, eyes, beak, or other body parts, the use of UV emitters 138 with wavelengths from 270 nm to 290 nm are preferred along with positioning the UV emitters 138 such that if they are powered when animals are using the station 100, they are blocked from exposure to the UV light. This can be accomplished by locating the emitters 138 in a position that an animal's beak and proboscis are not exposed while drawing sustenance through ports 129 by, for example, using one or more UV-blocking barriers. Alternatively or additionally, data from sensors such as, but not limited to imaging 112, audio 113, or motion 114 sensors, may be processed by software executing in the controller 105 to determine the presence of an animal at the station and apply power to the UV emitters 138 only when no animals are present. Though FIG. 1A depicts two emitters 138, any number (including 0) of emitters may be used to accommodate different sizes and geometries of stations 100 according to the configuration desired for other given embodiments.

To facilitate cleaning the feeding tray 102, some embodiments may have a piezoelectric ultrasonic transducer 141 mounted inside the feeding tray 102. When the feeding tray 102 requires cleaning, it may be detached from the storage vessel 101, emptied of any remaining liquid 104, filled with a cleaning solution, and by activation of a cleaning mode the ultrasonic transducer 141 creates pressure waves in the solution that dislodge biotic agents clinging to the interior surfaces of the feeding tray 102. The ultrasonic transducer 141 may be driven by an electrical load output from the controller 105, or by a separate circuit that is activated when external power is applied through a connector located on a component of the station 100.

Figure 3A:
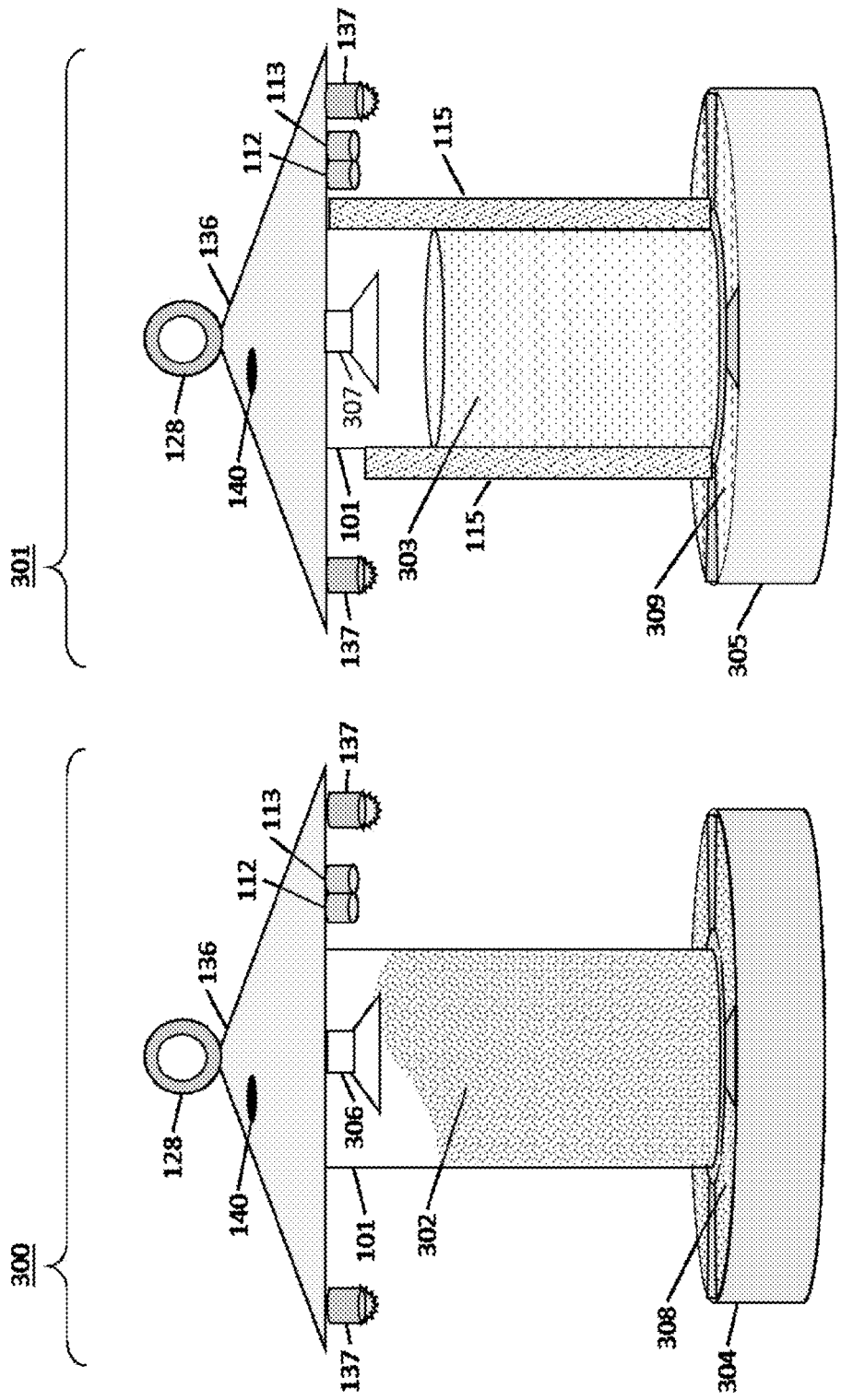
FIG. 3A depicts component schematics of flying animal liquid- and solid-sustenance station control, monitoring, and reporting stations.

Any number (including 0) of imaging 112 or audio 113 sensors may be used in an embodiment, and may be located near feeding ports 129 as shown in FIG. 1A, or on the underside of the cap 136 as depicted in FIG. 3A, or anywhere as required to accommodate different sizes, geometries, or intended applications of stations 100 of other embodiments to optimize animal or station area viewing, listening, and recording objectives.

Station 100 and other embodiments may or may not include status lights 122 attached to the station 100 in a location that allows them to be viewed externally by users looking from a distance (e.g., when gardening, viewing through window). This serves to provide a visual indication of key station parameters without the need to view the station status page 700 or Dashboard 706 on a computing device. Multiple status lights 122 may be positioned around the periphery of the station to facilitate viewing from all angles. Two LED lights are illustrated as status lights 122 in FIG. 1A, FIG. 3B, FIG. 3C, and FIG. 3D with the intended function of indicating the state (on or off) of station 100 power, the state (on or off) of the TEC 108 or R heater 139, and the liquid level LOW status. FIG. 3D shows one way that two LEDs, one green and one red, may be driven by the controller 105 to indicate the status described. Status lights 122 might also be implemented using a single, bi-color, green and red LED. Some embodiments may implement status indicators as LED or LCD displays capable of displaying alphanumeric characters to convey status information.

Located in the lower part of feeding tray 102 beneath the sealing barrier 103, the station controller 105 receives input from sensors, and drives electrical loads, that are located both within (FIG. 1A) and external (FIG. 1B & FIG. 1C) to the station 100. In the preferred embodiment, the controller 105 is capable of communicating wirelessly using one or more standard communication protocols such as, but not limited to, 802.11, Bluetooth, RFID, ZigBee, XBee, Cellular, et al. through the use of one or more antennas 125. The controller 105 has additional sensory input capacity referred to as auxiliary inputs 134 to receive data from external sensors FIG. 1C, and additional output drive capacity referred to as auxiliary outputs 135 to drive external electrical loads FIG. 1B. External sensors FIG. 1C and electrical loads FIG. 1B may be physically attached to the station 100 or mounted elsewhere within communication range of the controller 105. External sensors and loads may be communicatively coupled to the controller via wired connections or wirelessly.

FIG. 1B depicts an example of flying animal liquid-sustenance station electrical loads driven by auxiliary outputs 135 from the controller. Some examples of electrical loads that may be used in various embodiments are one or more lamps (e.g., LEDs) for area lighting 123 to shine on a broader area than those illuminating the station 137, and one or more speakers 124 for creating sounds such as flowing water that might attract flying animals to a station dispensing drinking water. The loads used in various embodiments are not limited in number or variety. Some embodiments may use no auxiliary loads while other embodiments may use alternative or additional loads 126.

Figure 6:
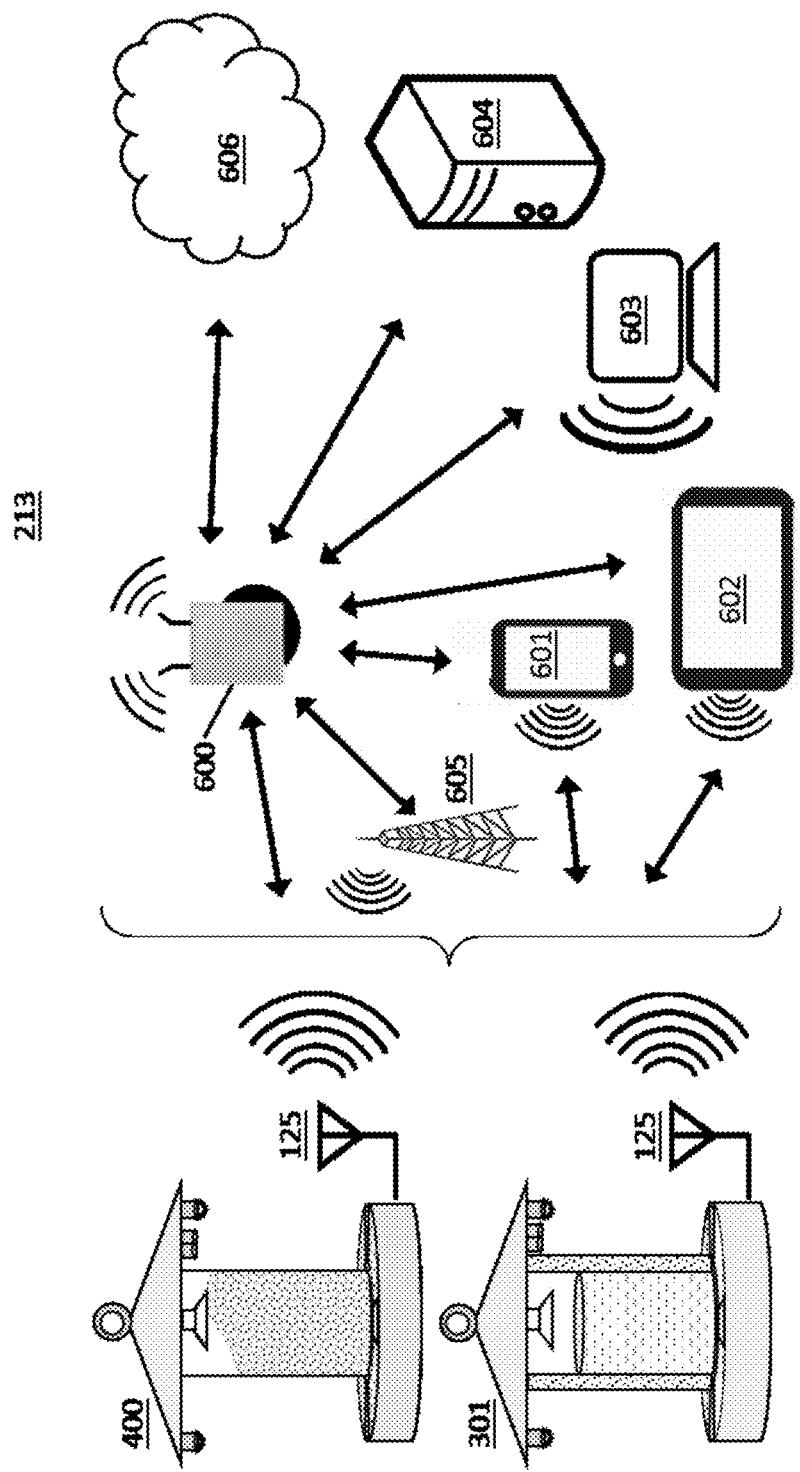
FIG. 6 depicts flying animal sustenance station wireless communication with devices.

FIG. 1C depicts an example of flying animal liquid-sustenance station external sensors connected to auxiliary inputs 134 of the controller. The RFID antenna 118 sensor is ideally located near where flying animals may hover or perch at the station so that software executing in the controller 105 can detect, interrogate, and read RFID tags that some animals may carry. The other collection of sensors depicted are those typically used to provide data on weather conditions near the station. The weather condition sensors shown are temperature (T) sensor 117, relative humidity (H) sensor 116, barometric pressure (BP) sensor 119, rain (R) accumulation sensor 120, and wind (W) speed and direction sensor 121. Sensor information gathered by controller 105 may be communicated wirelessly to a computing device as depicted in FIG. 6, and viewed in the station status page 700 or Dashboard 706. Some embodiments may use no auxiliary sensors while other embodiments may use alternative types of sensors, or additional sensors 127. The sensors used in various embodiments described herein are not intended to be limiting in type, quantity, or variety of sensors that may be used in other embodiments.

Figure 2A:
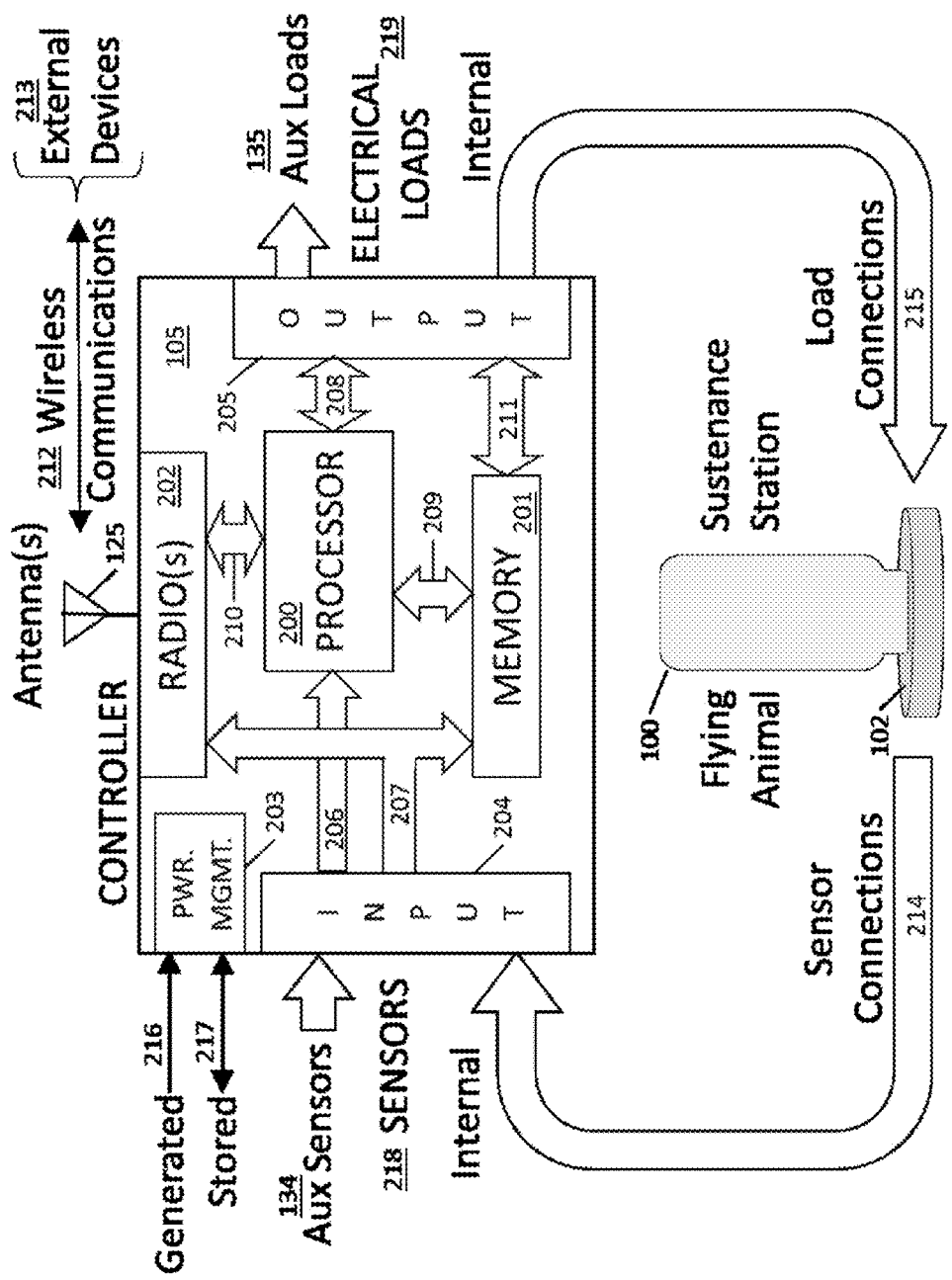
FIG. 2A illustrates a flying animal sustenance station control, monitoring, and reporting system block diagram.

FIG. 2A illustrates one embodiment of a flying animal sustenance station control, monitoring, and reporting station controller 105 block diagram. Controller 105 comprises a processor 200 for executing software instructions retrieved from memory 201, and retrieving and storing data in memory 201, accessible through memory data bus 209. The processor 200 may acquire data from sensors 218 directly through input data bus 206, or may selectively enable sensor input data 218 on a per-sensor basis, to be routed directly to memory through direct memory access (DMA) data bus 207. For illustrative purposes, FIG. 2A depicts the processor 200 as having a dedicated memory data bus 209 and a dedicated input data bus 206 while a separate DMA data bus 207 is dedicated for direct communication with the memory 201 by the input module 204 and the radio(s) 202, but other embodiments may contain architectures where communication buses are combined.

The processor 200 communicates with the output module 205 via output data bus 208 for driving electrical loads 219, and for receiving electrical load status information, if available, from output module 205. The processor 200 communicates with one or more radios 202 through data bus 210 to facilitate wireless communications 212 with external devices 213, through one or more antennas 125. The one or more radios 202 may be capable of communicating at frequencies and power settings chosen to conform with various wireless networking protocols such as IEEE 802.11, Bluetooth, Cellular, Zigbee, XBee, RFID, and any other wireless networking protocol that meets the wireless communication requirements for a given embodiment.

Electrical wiring for all sensors contained within the station 100 are routed to the input module 204 as depicted in internal 214 sensor connections, and connections from sensors external to station 100 are routed to the input module 204 as depicted in auxiliary 134 sensor connections. The input module 204 acquires and digitizes sensor input signals as directed by the processor 200, which under program control may set the acquisition rate on a per-sensor basis, may configure the input module 204 on a per-sensor basis to send acquired data directly to a specified buffer in memory 201 under DMA control, or directly to a specified buffer within one or more radios 202. The radio(s) 202 may support DMA transfers to or from memory 201 to, for example, transmit sensor data streams buffered in memory 201 over wireless communications link 212 to external devices 213, or load software or configuration data received over wireless communications link 212 from external devices 213 into memory 201. While DMA control is not a required for routing sensor data from input module 204 to memory 201 or radios 202, it reduces the processing load of processor 200 for acquiring multimedia data streams such as video and audio from imaging 112 and audio 113 sensors, as well as any sensor data acquired periodically at a less frequent rate. The processor 200, may also read sensor input data from the input module 204 at any time by reading the most recently acquired data that has been stored in a register by the input module 204. Techniques described herein for acquiring, routing, storing, and reading sensor data from the input module 204 are for exemplary purposes and not intended to limit the scope of how embodiments acquire, route, store, and read sensor input data.

Under programmed control, the processor 200 controls the output module 205 to activate or deactivate power or to send signals such as digital audio (e.g., MP3 audio coding format file) stored in memory 210, to electrical loads 219 through internal load connections 215 for loads considered internal to the station 100, and through auxiliary loads 135 connections for loads considered external to the station 100. The output module 205 may be able to stream digital audio files from memory 201 via output module 205 DMA data bus 211 for conversion to analog signals that are input to amplifier circuitry within output module 205, which drives audio output loads such as speakers 124. The output module 205 may comprise volatile or non-volatile memory within to obviate the need for using a DMA data bus 211 to stream media files from memory 201 external to the output module 205. The output module 205 may detect the operational state of electrical loads 219 and report them through an electrical load status register that may be read by processor 200 via data bus 208. The preferred technique for detecting the state of electrical loads 219 is to sense the current flowing through the load when power is applied or removed, and store the measured current for each load in a status buffer that may be read by the processor 200 via data bus 208. Detection and reporting of load status may be accomplished through the use of simpler or more complex techniques in other embodiments depending upon their individual station system requirements.

The power management module 203 receives power through a connection to a generated 216 power source (e.g., transformed household line power, fuel cell, solar power, wind power) or through a connection to a stored 217 power source (e.g., battery, super capacitor), and conditions and transforms it to supply the voltages and currents required by the modules comprising the controller 105. With the variety of power management integrated circuits currently marketed (e.g., from Linear Technology Corp.) that can operate from input voltages ranging from 2.4 to 28 volts at currents from 2 to 12 amperes, the designer of a given embodiment may choose from a variety of power converters for supplying generated 216 power.

One example of a generated 216 power source converter is a 12 volt 60 watt module power supply that converts 120 volts AC to supply 12 volts DC at 5 amperes—sufficient power to drive a TEC (TEC1-12703) load at 36 watts, various LED loads, audio loads, and the electrical component modules within the controller 105. Other generated 216 power sources may be used such as solar panels, fuel cells, and wind generators. To ensure continuous operation of the station 100 when generated 216 power is interrupted due to a power outage, fuel cell fuel exhaustion, or lack of sufficient wind for wind generators or sun for solar panels, one or more power storage devices in the form of e.g., batteries, super capacitors, etc. may be coupled to the station through the stored 217 power input. The power management module 203 may operate to maintain the state of charge of the power storage device(s) while sufficient generated 216 power is available, and may automatically draw power from the stored 217 power source when generated 216 power is not available, or to augment the generated 216 power supply for a limited time should the electrical load 219 demand temporarily exceed the capacity of the generated 216 supply.

Figure 2B:
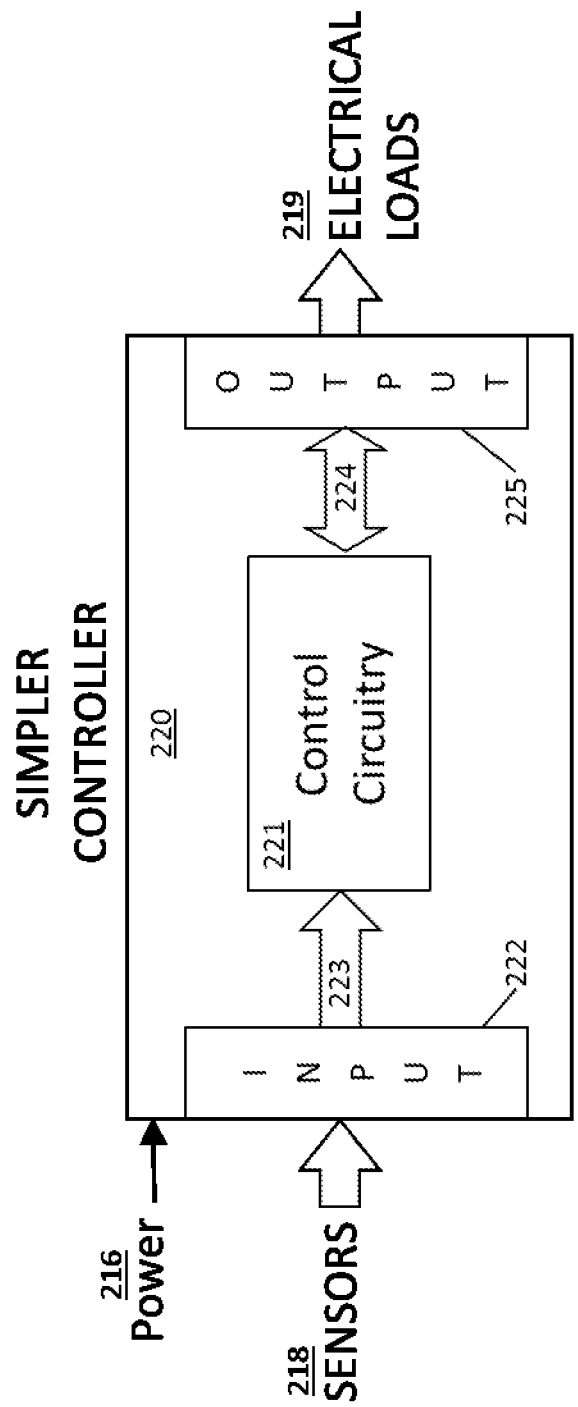
FIG. 2B shows flying animal sustenance station alternative controller configurations.

FIG. 2B depicts a simpler embodiment of a flying animal liquid sustenance station controller block diagram. The simpler controller 220 receives power 216 that is conditioned for use by electrical components within the controller 220, and to provide power to electrical loads 219 as well as any station sensors 218 that may require power. Controller 220 comprises input circuitry 222, control circuitry 221, and output circuitry 225. Input circuitry 222 receives input signals from sensors 218, conditions them as required (e.g., impedance matching, signal buffering, amplification) and communicates the sensor data to control circuitry 221 via input data bus 223. Control circuitry 221 uses data from input data bus 223 to control the activation and deactivation of electrical loads 219 through output data bus 224 and output circuitry 225 designed to drive the electrical loads 219. Output data bus 224 may also convey the status of electrical loads (e.g., heater on/off state) that may be monitored and reported by electrical load drivers in output circuitry 225 module, to control circuitry 221. Control circuitry 221 may comprise one or more analog, digital, or discrete components, a microcontroller, or any combination thereof to implement one or more functions such as, but not limited to those of the following list:

a) Controlling a heating component to maintain the liquid sustenance approximately at or above a selected temperature threshold;

b) Controlling a cooling component to maintain the liquid sustenance approximately at or below a selected temperature threshold;
c) Determining the approximate level of liquid sustenance remaining in the station;
d) Inhibiting power to the heating and cooling components when the liquid sustenance level is below a specified level;
e) Controlling power to one or more ultraviolet (UV) light emitters 138 on a specified schedule, or based on the time of day as measured by a digital clock or a daylight detection sensor (e.g., photocell) or both.
f) Controlling power to one or more station lights 137 on a specified schedule, or based on the time of day as measured by a digital clock or a daylight detection sensor (e.g., photocell) or both.
g) Controlling power to one or more station status lights FIG. 3D: 122 to indicate the station power state, the state of one or more electrical loads (e.g., Heater/Cooler On/Off), the state of the sustenance supply (e.g., Low Food), and/or other specified information.
h) Playing an audio file (e.g., MP3 audio coding format file) stored in memory within the control circuitry 221 module, by converting it to an analog signal, amplifying it, and sending it to a station audio output device (e.g., speaker 124). An audio file may be played continuously, on a specified schedule, or based on the time of day as measured by a digital clock or a daylight detection sensor (e.g., photocell) or both.
i) Activating an ultrasonic cleaning actuator 141 when commanded through a switch or by other means when the cleaning part or all of the station.

The functionality of the station controllers is not limited to that described herein, and may be performed by one or more types of analog and digital discrete and integrated hardware components singly, multiply, or in any combination. Examples of types of hardware that may be used are, but not limited to: microcontrollers, field-programmable gate arrays (FPGAs), complex programmable logic devices (CPLDs), application-specific integrated circuits (ASICs), application-specific standard products (ASSPs), system-on-a-chip (SOC) ICs, comparators, operational amplifiers (Op Amps), power management (PM) ICs, transistors, relays, etc. Station controllers need not be packaged together on a single controller circuit card, but modules and components may be located apart from, but still communicatively coupled to others to accommodate the packaging or other requirements of station embodiments.

FIG. 3A depicts an example of an embodiment of a flying animal combined liquid-, and solid-sustenance control, monitoring, and reporting station. This particular combination has the benefit of providing solid sustenance (e.g., seeds, nuts) with liquid sustenance (e.g., water) in a communicatively-coupled configuration with a common controller, or with individual controllers that communicate with each other for control, monitoring, and reporting functions. The combined stations may be physically separate as depicted, or may be physically joined and may or may not be separable so that they can be independently removed for servicing (e.g., refilling, cleaning), and replaced. Further, station combinations are not limited to one of each type, but may comprise any combination of single or multiple liquid and solid sustenance stations. Individual stations within a combined station are all communicatively coupled in a way that enables control, monitoring, and reporting of the combination of stations.

The individual stations shown in the combined station depicted in FIG. 3A are solid-sustenance station 300 and liquid-sustenance station 301. They are each depicted as having features in common, many of which have been previously described herein, but this is only for illustrative purposes and is not intended to be limiting in any way with respect to type, quantity, combination, or placement of features, sensors, electrical loads, components, etc. that may be used for individual stations within a combined station.

Stations 300 and 301 are depicted with storage vessel 101 having a cap 136 with an attachment ring 128 mounted to the cap 136, providing the ability to suspend stations 300 and 301 from an overhead support such as a porch ceiling, eave, tree branch, pole with support arm, etc. The caps 136 may have a hole 140 positioned near the attachment ring 128, through which electrical wiring carrying power and other electrical signals may be routed to and from the stations 300 and 301 as may be required for specific embodiments or combined station mounting configurations. Individual station caps 136 may also be fitted with electrical loads such as station 300 & 301 area illuminating lamps 137, or other electrical loads such as, but not limited to, speakers 306 and 307, or fitted with sensors such as, but not limited to, audio 112 and imaging 113 sensors as depicted mounted to the caps 136. The storage vessel 101 of station 300 stores solid sustenance 302 (e.g., seeds, nuts) and attached to the bottom of storage vessel is the feeding tray 304 into which solid sustenance 302 from the storage vessel 101 is dispensed. The feeding tray 304 is removably attached to the storage vessel 101 (via e.g., threaded coupling, snap on & releasable fitting) to facilitate cleaning and solid sustenance 302 replenishment, and has one or more openings 308 positioned around the top surface from which the animals access the sustenance 302 for consumption.

The storage vessel 101 of station 301 stores liquid sustenance 303 (e.g., water) and attached to the bottom of storage vessel is the feeding tray 305 into which liquid sustenance 303 from the storage vessel 101 is dispensed. The feeding tray 305 is removably attached to the storage vessel 101 (via e.g., threaded coupling, snap on & releasable fitting) to facilitate cleaning and liquid sustenance 303 replenishment, and has one or more openings 309 positioned around the top surface from which the animals access the sustenance for consumption. To facilitate access to the liquid sustenance by larger animals, the openings are typically larger than those that would be designed for a tray targeted only for small flying animals (e.g., hummingbirds, moths, bats). The liquid-sustenance station 301 may have an insulating or other type of material 115 wrapped around or otherwise fixed to the outer surface of the storage vessel 101 for facilitating temperature regulation of the liquid sustenance 303.

Figure 3B:
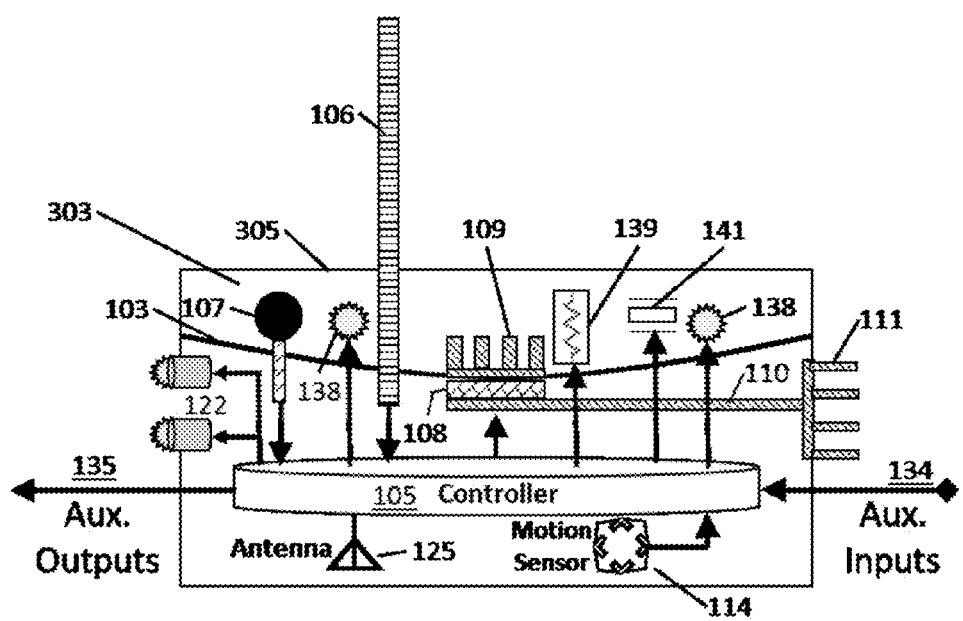
FIG. 3B illustrates a liquid-dispensing tray with controller and other components.

The liquid sustenance (typically water in combined station embodiments) dispensing tray 305 depicted in FIG. 3B is shown in a schematic representation of the tray used by flying animals (e.g., song birds) to consume the liquid sustenance, with the controller 105 connected with the sensors, electrical loads, antenna(s) 125 and auxiliary inputs 134 and outputs 135. The sensors, electrical loads, and other components of the tray 305 shown in FIG. 3B are substantially the same as those depicted in FIG. 1A and function as described in the paragraphs related to FIG. 1A. The types and number of sensors, electrical loads, and other components used in the tray 305 are not limited in any way and other embodiments may use more or less of any sensor, load, or other component as appropriate to the needs of the particular embodiment design.

Figure 3C:
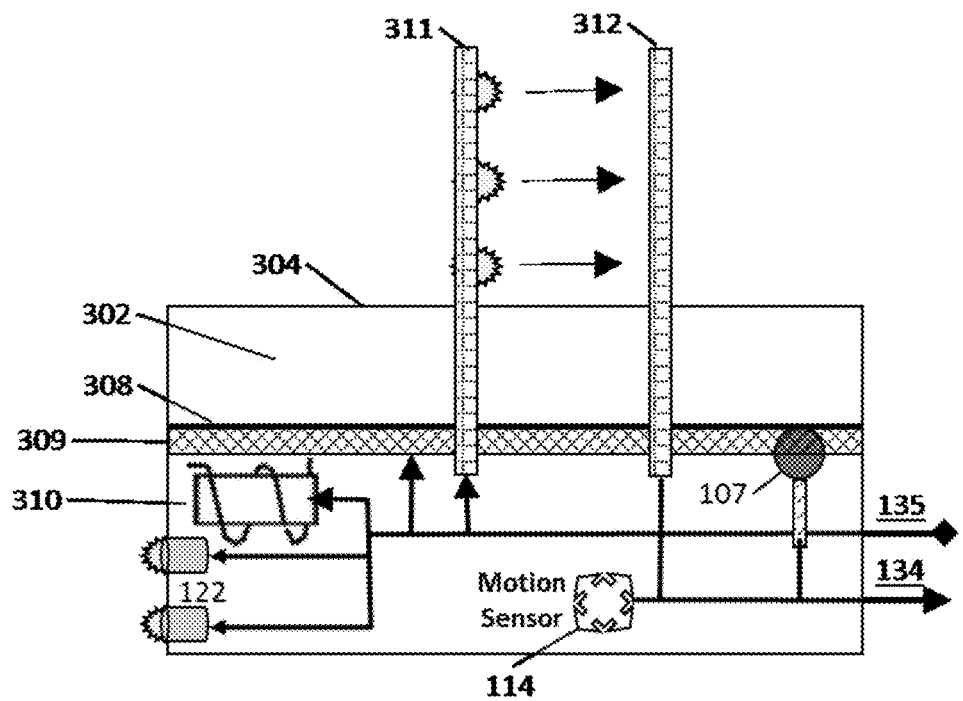
FIG. 3C illustrates a solid-dispensing tray with auxiliary components.
Figure 3D:
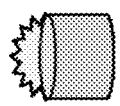
FIG. 3D depicts power, heating, and cooling state visual indicators.
Figure 3D:
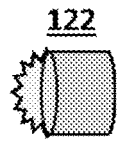

In this particular embodiment of a flying animal combined liquid-, and solid-sustenance control, monitoring, and reporting station, the dispensing tray 304 of the solid-sustenance station 300 contains sensors and electrical loads that are connected by wiring to the controller 105 within the liquid sustenance dispensing tray 305. FIG. 3C illustrates a solid-dispensing tray 304 with a solid sustenance 302 level-sensing component comprising a light emitter array 311 whose light emissions are sensed by a light sensor array 312. The level-sensing component depicted extends above the tray 304 into the storage vessel 101 for measuring the amount of solid sustenance 302 remaining in the station 300. Other means of measuring solid sustenance 302 level may be used such as, but not limited to acoustic (e.g., ultrasonic), station weight sensing, float level, etc. and other embodiments may have no solid sustenance 302 level measurement sensor.

The dispensing tray 304 has a sealing barrier 308 to prevent solid sustenance 302 in the space above the sealing barrier 308 from entering the space below it. The space below the sealing barrier 308 houses sensors wired to the auxiliary inputs 134, and electrical loads wired to the auxiliary outputs 135 of the controller 105 within the liquid-sustenance dispensing tray 305. Under control of the controller 105, the low-temperature heating element 309 warms the sealing barrier 308 that is thermally conductive so that it, in turn, warms the solid sustenance 302 to help evaporate moisture that may accumulate in the solid sustenance 302. The temperature sensor 107 is thermally bonded to the heating element 309 and provides feedback to the controller 105 indicating the temperature of the heating element 309.

The motion sensor 114 senses motion of the solid-sustenance station 300 due to animals contacting the station, as well as forces of weather such as wind, rain, etc., and provides output indicating station motion to the controller 105. When the controller 105, based on a predetermined signature of motion sensing input, determines that an undesired large animal (e.g., rat, squirrel, raccoon) has landed on the station, the controller 105 may activate the noise-making solenoid 310 one or more times in succession to surprise the undesired animal to discourage their presence. The solenoid 310 is affixed to the tray in a manner so that the solenoid rod strikes a surface that produces both a loud noise and vibration that can be heard and felt by animals at the station. Actuation of the solenoid 310 may be augmented by surprising sounds sent through electrical load outputs by the controller 105 to the solid-sustenance station loudspeaker 306, to further discourage the presence of animals not desired at the station. The controller ceases activation of noise-making electrical loads when it has determined, based on a predetermined signature of motion sensing input, that the undesired animals are no longer present. The use of motion sensing by the controller 105 for detection of the presence or absence of undesired animals at the sustenance station, may be augmented by the output of algorithms processing sound and images received via inputs from audio 112 and imaging 113 sensors. Such algorithms may help determine the cause of unexpected motion by recognizing characteristic sounds that are made by undesirable animals, and recognition of animal features such as size, shape, body characteristics, etc. from images.

As discussed previously, multiple status lights 122 may be positioned around the periphery of the station to facilitate viewing from all angles. Two LED lights are illustrated as status lights 122 with the intended function of indicating the state (on or off) of station power, the state (on or off) of the heating element 309, and the solid-sustenance level LOW status. FIG. 3D shows one way that two LEDs, one green and one red, may be driven by the controller 105 to indicate the status described.

Figure 3E:
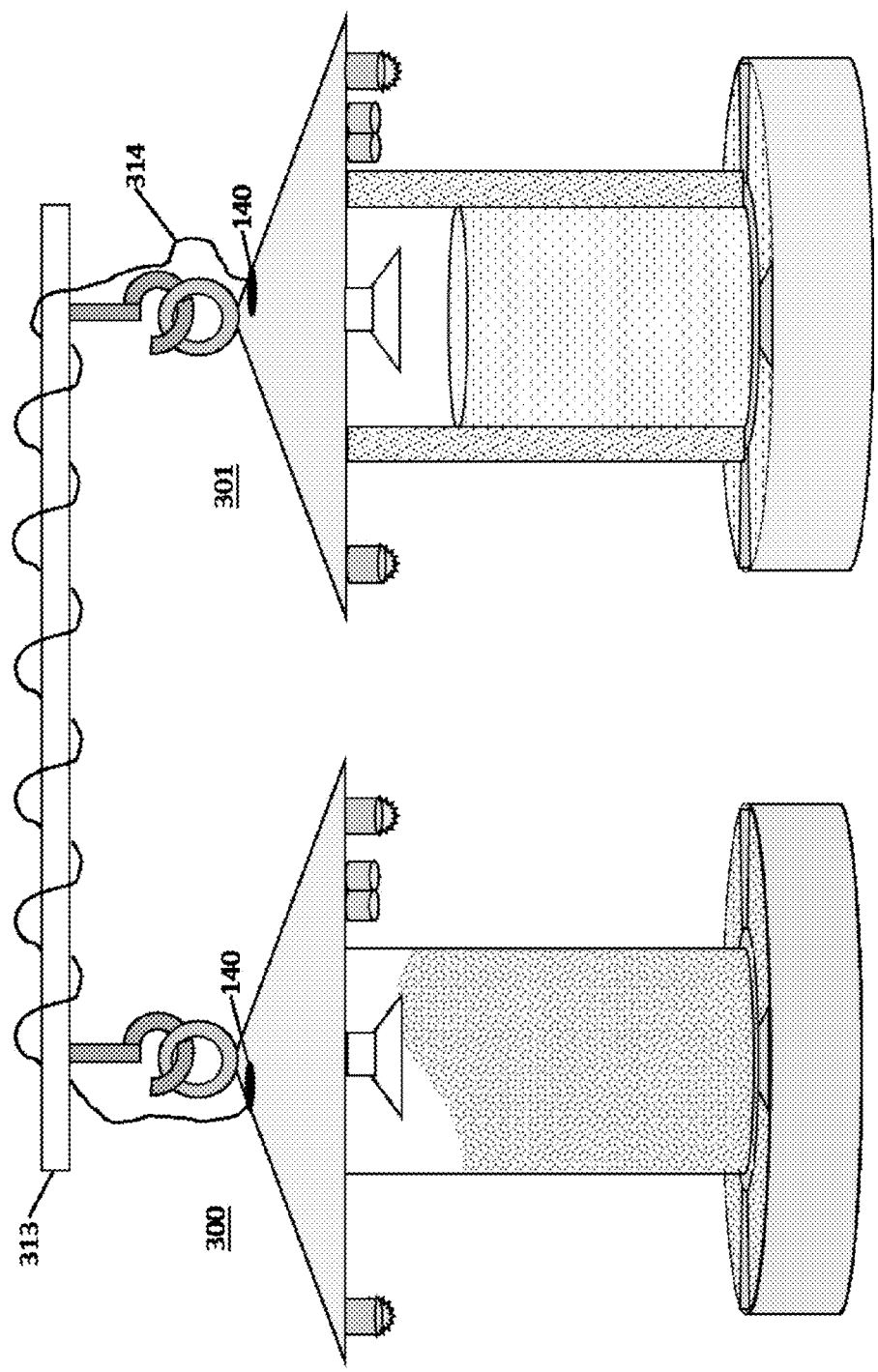
FIG. 3E illustrates a wired communication link between multi-dispenser flying animal liquid-dispensing and solid-dispensing sustenance stations.

FIG. 3E illustrates a wired power and communications link between liquid-dispensing and solid-dispensing sustenance stations of a combined liquid-, and solid-sustenance control, monitoring, and reporting station. Wiring bundle 314 is routed from station 301 to station 300 along the station support member 313 or by some other means determined by the installation, and into each station through opening 140 or by other means (e.g., a weather-sealed connector). Stations 300 and 301 may be located any distance from each other provided the power and communications cables are appropriately sized so that power loss and signal degradation are within design constraints. The number and size of wires carried in wiring bundle 314 may be reduced in some embodiments with the addition of a data acquisition, communication, and driver (DACD) module (e.g., microcontroller, PLD, ASIC, FPGA) to the solid-sustenance station that can communicate with the controller 105 over one or more serial links (e.g., I²C, CAN, Ethernet) to send digitized sensor data and receive electrical load actuation commands. In this embodiment, the DACD module would comprise electrical load driver circuitry to eliminate the need for wires large enough to handle electrical load drive current—thereby reducing the wiring bundle 314 size to a minimum number of wires carrying power, return, and communication link wires. Other embodiments may forego the use of a wired communications link in favor of wireless communications (e.g., Bluetooth, 802.11, Zigbee, Xbee) from the DACD module in station 300 to the controller 105 in station 301—thereby reducing the wiring bundle 314 in size to accommodate only power and return wires.

Figure 4A:
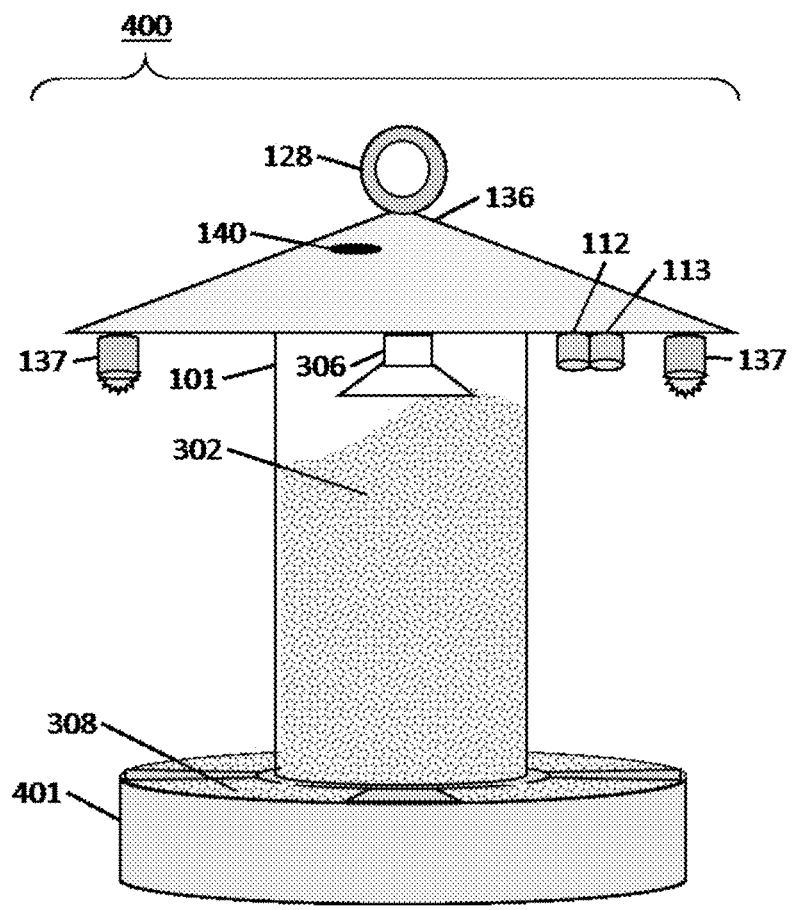
FIG. 4A shows a flying animal solid-sustenance dispensing station control, monitoring, and reporting system.

The flying animal solid-sustenance dispensing station 400 control, monitoring, and reporting system depicted in FIG. 4A is, except for the dispensing tray 401, the same as the solid-sustenance dispensing station 300 described in FIG. 3A. Similarly, the cap 136 may have a hole 140 positioned near the attachment ring 128, through which electrical wiring carrying power and other electrical signals may be routed to and from the station 300 as may be required for specific embodiments. The station cap 136 may also be fitted with electrical loads such as station 400 area illuminating lamps 137, or other electrical loads such as, but not limited to, speaker 306, or fitted with sensors such as, but not limited to, one or more audio 112 and imaging 113 sensors as depicted. The storage vessel 101 of station 400 stores solid sustenance 302 (e.g., seeds, nuts) and attached to the bottom of storage vessel 101 is the sustenance dispensing tray 401 into which solid sustenance 302 from the storage vessel 101 is dispensed. The feeding tray 401 is removably attached to the storage vessel 101 (via e.g., threaded coupling, snap on & releasable fitting) to facilitate cleaning and solid sustenance 302 replenishment, and has one or more openings 308 positioned around the top surface from which the animals access the sustenance 302 for consumption.

Figure 4B:
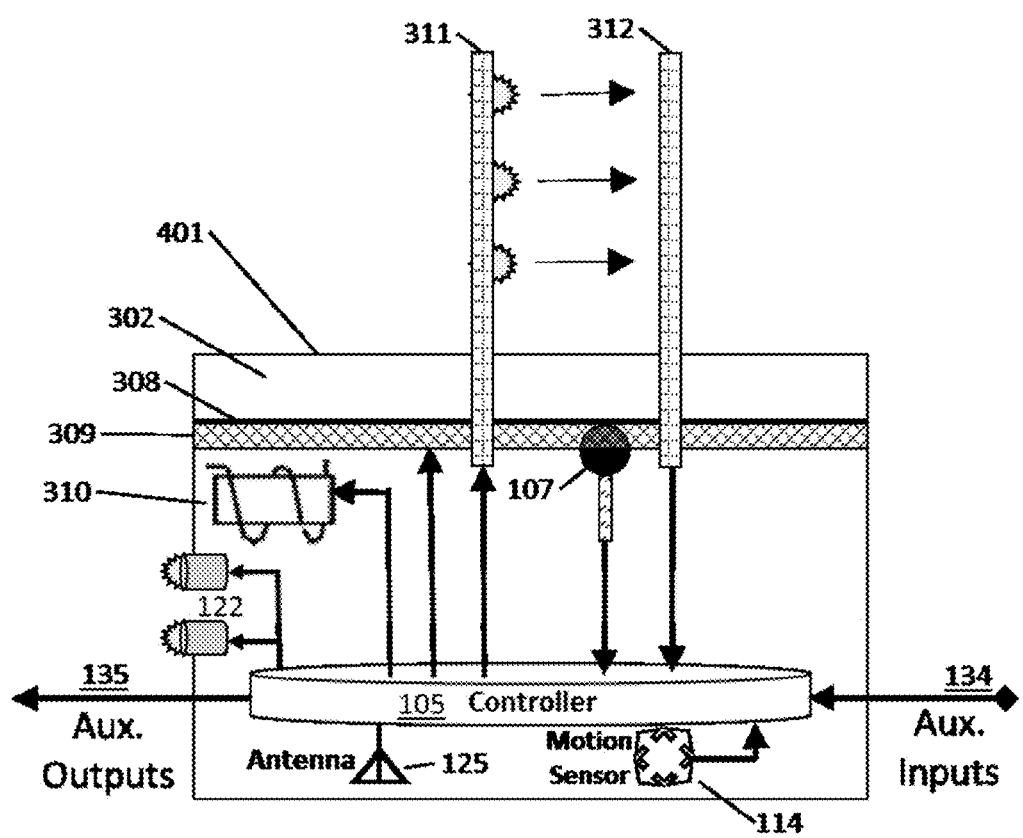
FIG. 4B depicts a solid-dispensing tray with controller and other components.

FIG. 4B depicts the solid-sustenance dispensing tray 401 that attaches to the station 400. It comprises the controller 105 discussed in the description of FIG. 2C, and the same sensors and electrical loads discussed in the description of FIG. 3C, and reproduced schematically in FIG. 4B for convenient reference. As in the liquid-sustenance stations 100 and 301 embodiments, the controller 105 in the solid-sustenance dispensing station 400 can drive external electrical loads (e.g., like those in FIG. 1B) via auxiliary outputs 135, and receive inputs from external sensors (e.g., like those in FIG. 1C) via auxiliary inputs 134.

Figure 5A:
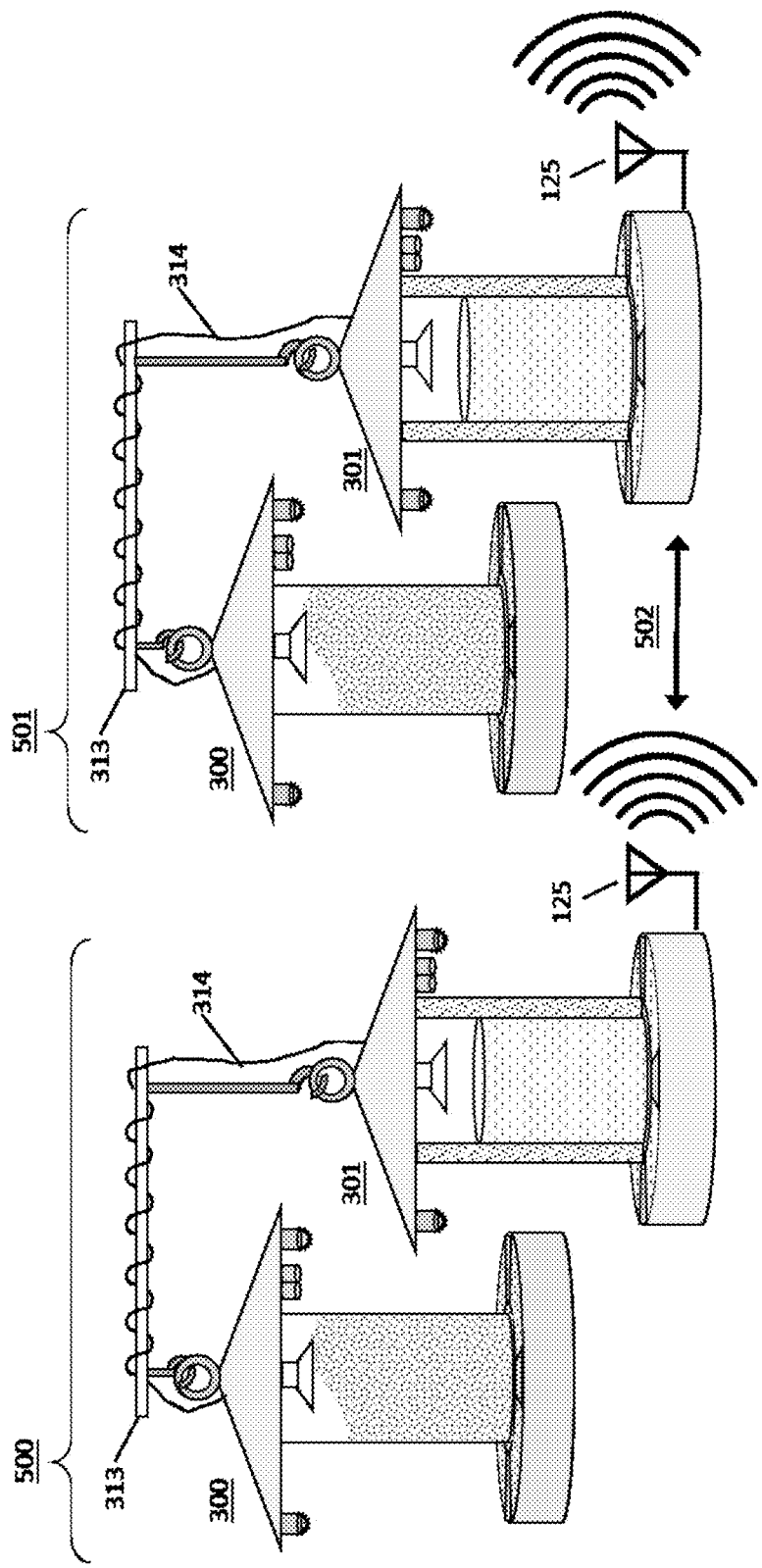
FIG. 5A illustrates controller communications between multiple flying animal liquid-dispensing and solid-dispensing sustenance stations.

FIG. 5A illustrates one combined sustenance station 500 (depicted in FIGS. 3A-3E) communicating wirelessly with another combined sustenance station 501 in a local area network (LAN) configuration. The station 500 communicates using one or more protocols such as (but not limited to)

802.11, Bluetooth, RFID, ZigBee, XBee, et al. through the use of antenna 125, via wireless communications 502 with station 501. In addition to communicating with station 500, station 501 can wirelessly communicate with a host of other external devices 213 such as (but not limited to) those depicted in FIG. 6 and described in subsequent paragraphs. Station 501 also functions as a wireless access point (AP) for station 500, thereby providing a conduit for it to communicate with the wider network of external devices as well. While FIG. 5A depicts two combined stations, this architecture may be scaled to any number combined stations that the networking architecture, power constraints, and controller designs allow.

Figure 5B:
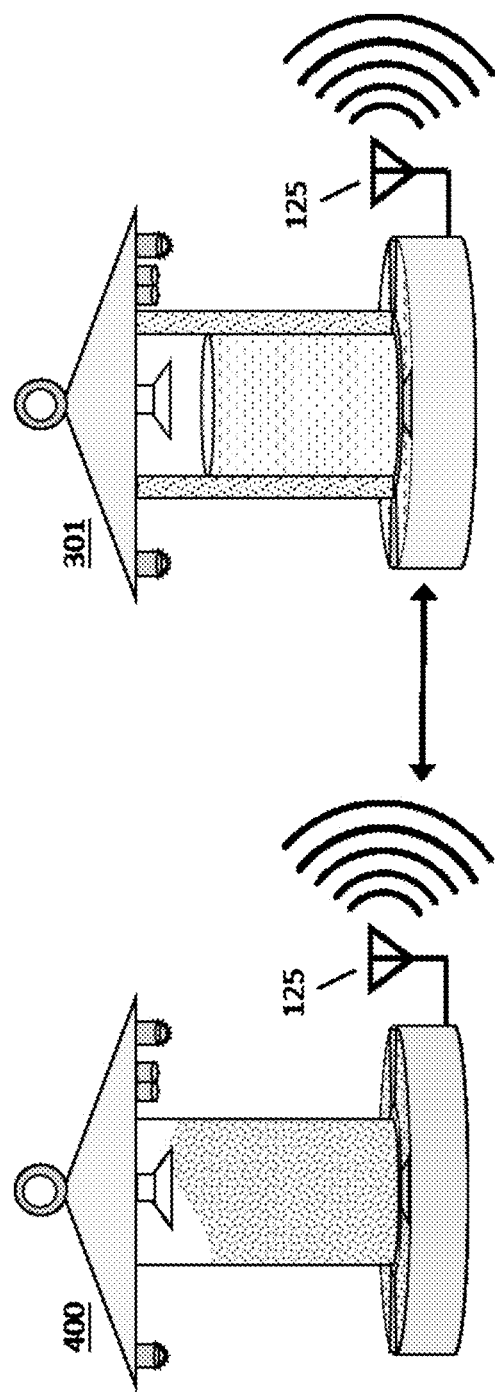
FIG. 5B illustrates wireless controller communications between flying animal liquid-dispensing and solid-dispensing sustenance stations.
Figure 5C:
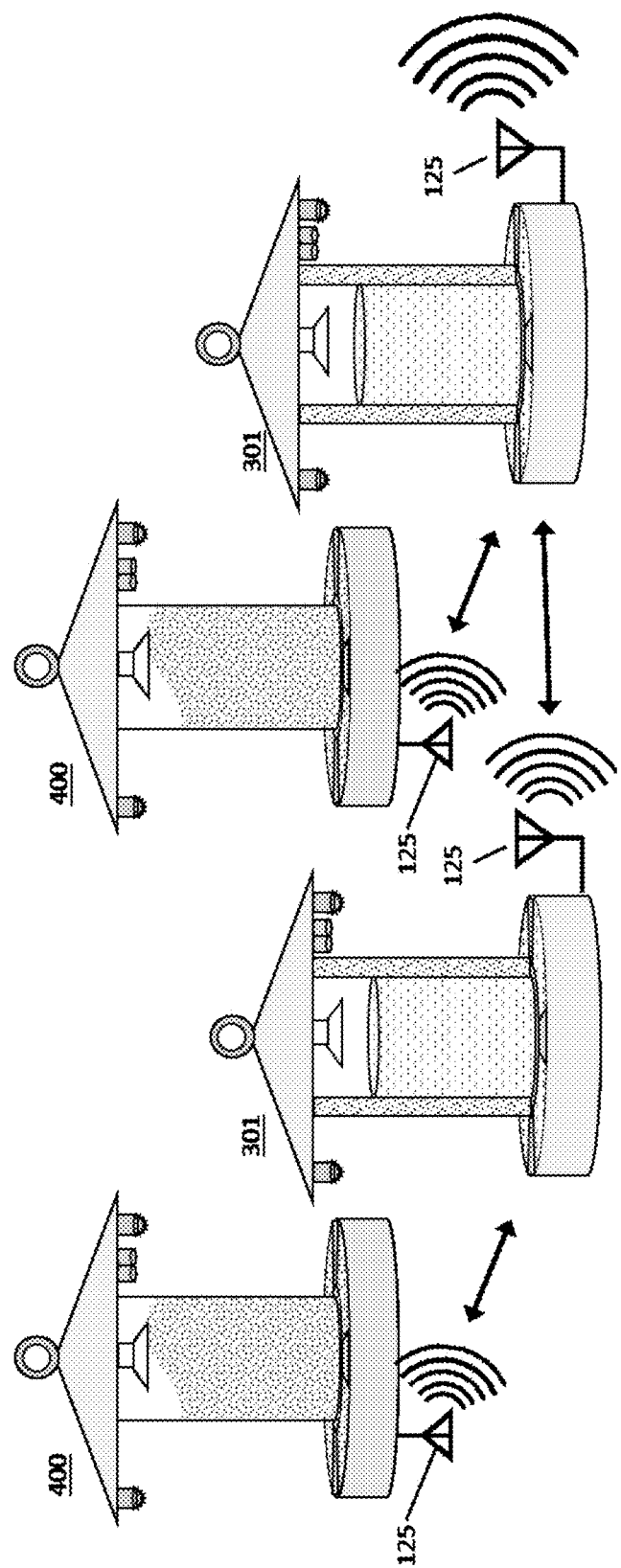
FIG. 5C illustrates wireless controller communications between multiple flying animal liquid-dispensing and solid-dispensing sustenance stations.

Multiple individual sustenance stations may be networked similarly to that illustrated in FIG. 5A for combined stations. FIG. 5B depicts two networked stations—one solid-dispensing sustenance station 400 and one liquid-dispensing sustenance station 301—wirelessly coupled and operating in the same manner as detailed in the text describing FIG. 5A. In this example, station 301 can wirelessly communicate with other external devices 213, and functions as a wireless access point (AP) for station 400, thereby providing a conduit for it to also communicate with the wider network of external devices. FIG. 5C depicts four individual stations of types 400 and 301 networked together and communicating with other external devices 213 through the AP service provided by one liquid-sustenance station 301 on the right side of the figure. This architecture may be scaled to any number combined stations that the networking architecture, power constraints, and controller designs allow. This networked station concept is not limited to the specific architectures illustrated herein, but the same concept may be implemented using different networking or other communication architectures (e.g., mesh net) or topologies that may, for example, have multiple stations providing AP services to other stations for communicating with other external devices 213.

FIG. 6 depicts flying animal sustenance stations 400 and 301 in wireless communication with one or more non-sustenance-station external devices 213 using one or more antennas 125. In addition to being stations capable of communicating wirelessly with a given sustenance station, external devices 213 may also be wireless routers 600, mobile devices (e.g., smart phones 601, tablets 602, laptop/notebook computers 603), desktop computers 604, Cellular networks 605, Cloud computing servers 606, and other wireless-enabled devices supporting protocols compatible with those used by the sustenance station controllers and/or the networks to which they are connected.

The wireless router 600 may be in direct wireless communication with one or more sustenance stations (e.g., station 400, station 301), or may be in direct communication with a cellular communication network 605 that is in communication one or more sustenance stations. The wireless router 600 may serve as an AP through which mobile devices (e.g., smart phones 601, tablets 602, laptop/notebook computers 603), desktop computers 604, Cellular networks 605, Cloud computing servers 606 may communicate with connected networked sustenance stations. Wireless-enabled devices (e.g., mobile devices, desktops) supporting protocols (e.g., WiFi, Bluetooth) compatible with those used by the sustenance station controllers may communicate directly with one or more wirelessly-enabled sustenance stations without routing through an AP as illustrated in FIG. 6, devices 601, 602, and 603. Cellular networks 605 and cloud servers 606 may communicate with the AP 600 via internet protocol, or other networking protocols that may be deemed suitable for a given embodiment.

Figure 8:
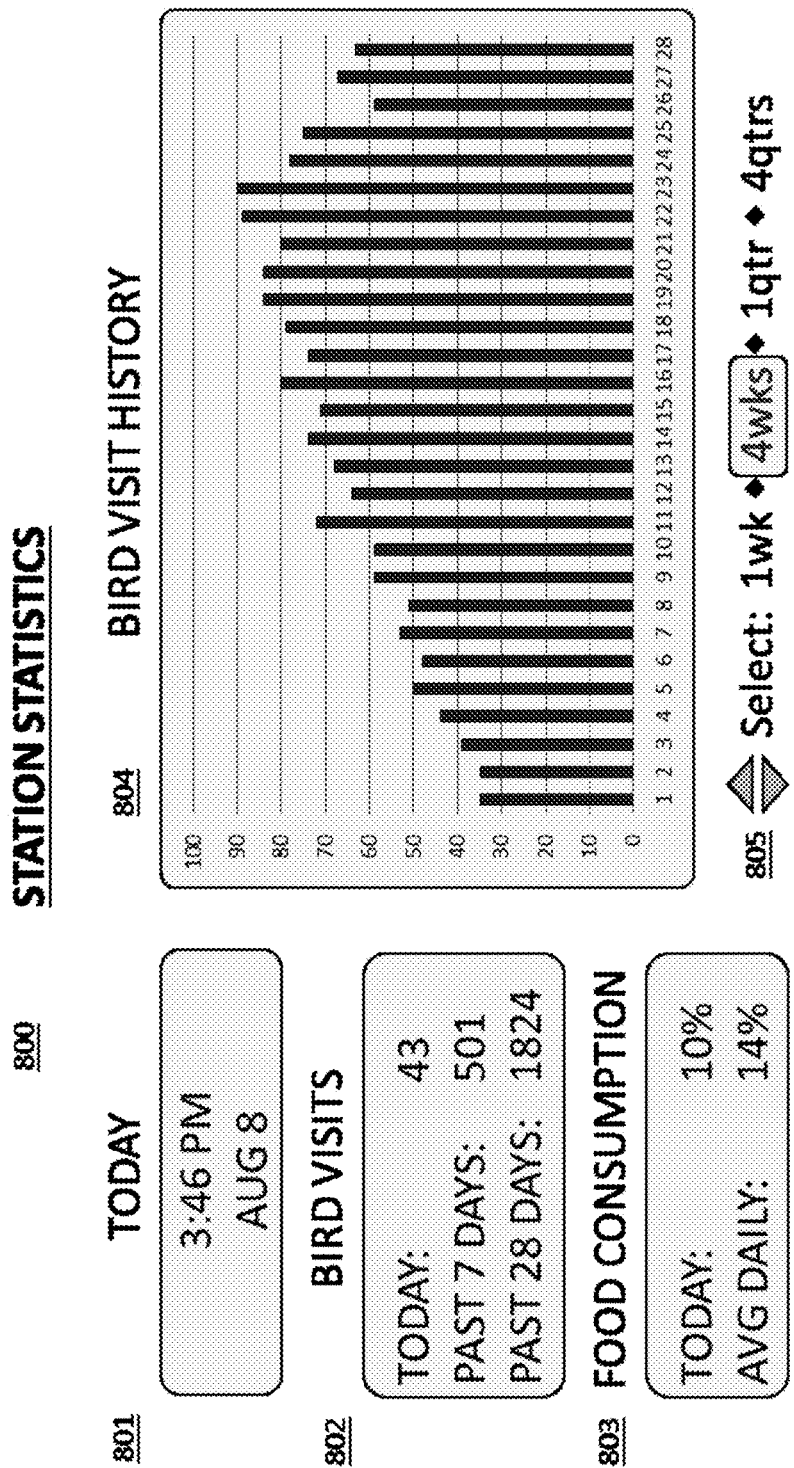
FIG. 8 depicts an example of a station status and bird activity statistics report.
Figure 9:
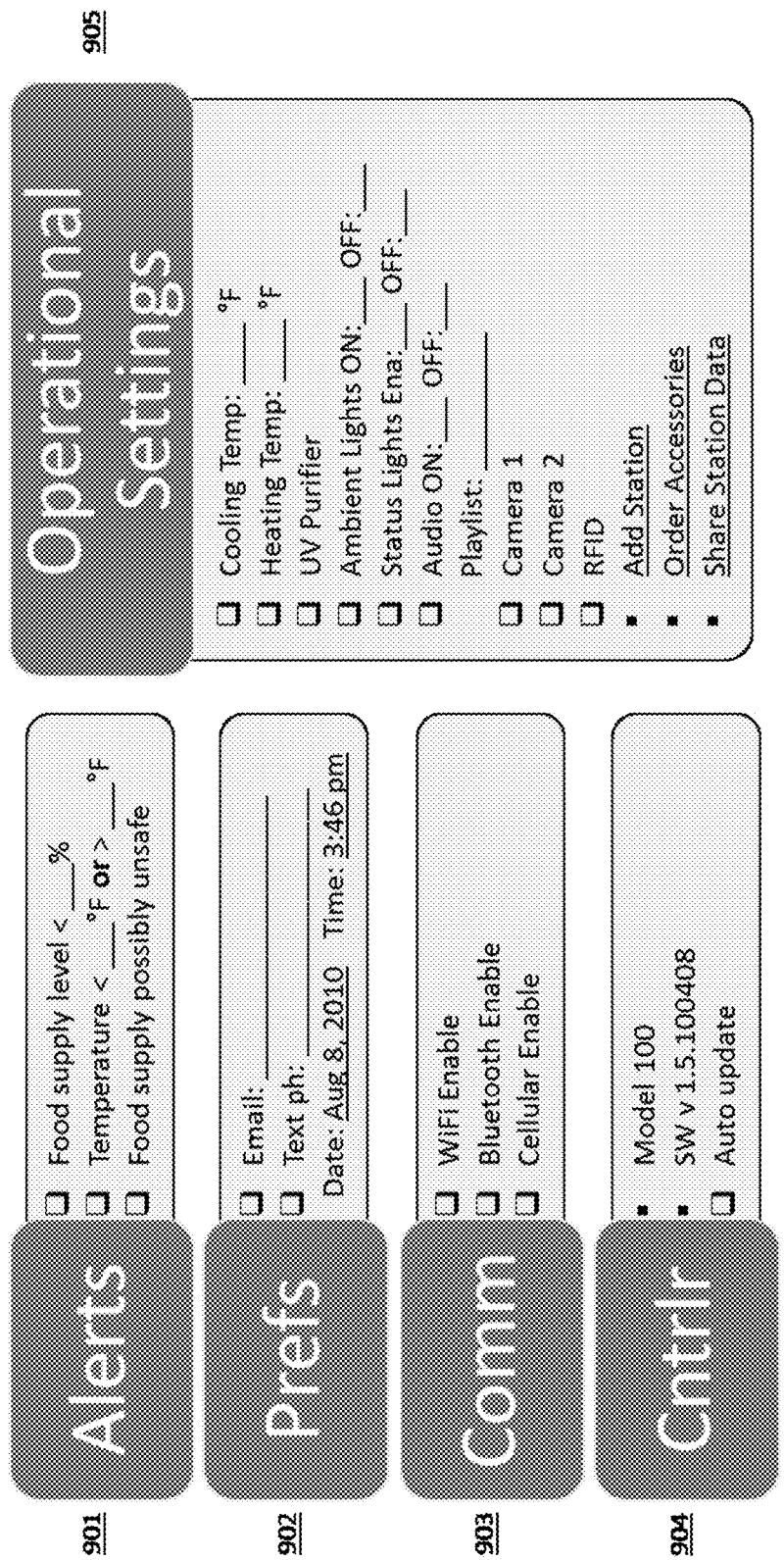
FIG. 9 depicts an example of a system configuration user interface.

Users may interact with sustenance stations (e.g., 400, 301) through a client application executing on one or more devices (e.g., 601, 602, 603, and 604), or through a web application hosted on a cloud server 606 or local server in communication with one or more sustenance stations. FIGS. 7 through 9 depict examples of how sustenance station sensor and load status information may be presented to a user, or how an application may provide a user interface (UI) for viewing and modifying sustenance station configuration settings (e.g., user preferences, alerts, communication, software update, operational). There are a plethora of ways to organize and present the sensor data, load status, statistical data, and UI for setup and configuration of one or more sustenance stations. The screens depicted in FIGS. 7 through 9 are exemplary only and not intended to be limiting in the type or amount of data, status, setup & configuration options, statistics, or any other information that may be presented to a user through a sustenance station application.

Figure 7A:
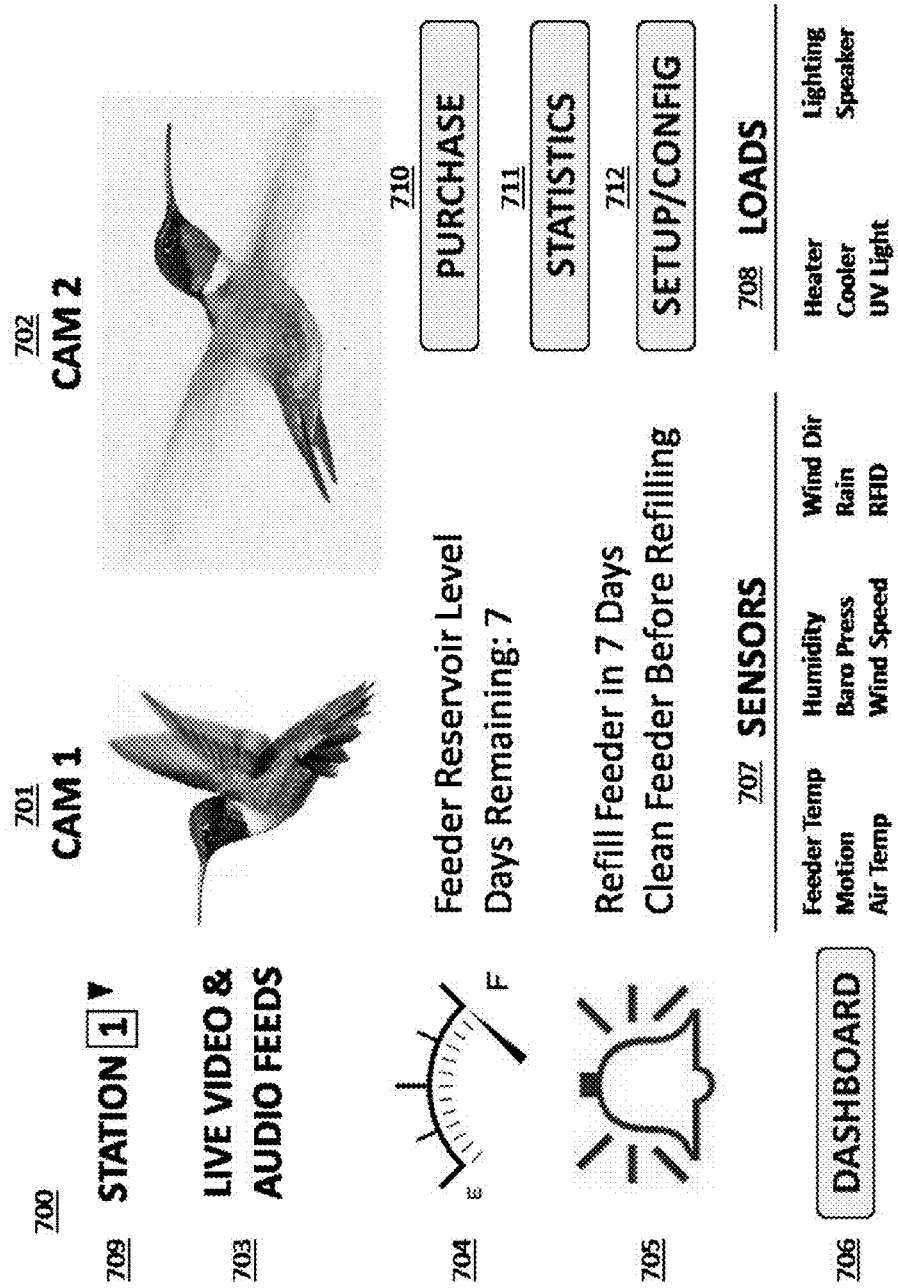
FIG. 7A depicts an example of a hummingbird feeder status report.

FIG. 7A depicts an example of a hummingbird feeder status page 700, illustrating one way station status may be presented to a viewer. The station select widget 709 allows the user to select the station (if multiple stations have been configured) from which the application pages receive and send data. Live video and audio sensor feeds 703 may be presented through image panes such as those shown as camera 1 (CAM 1) 701 and camera 2 (CAM 2) 702, with audio being routed through the user device audio system. Sustenance station reservoir level (shown full) may be reported in graphical format 704, along with an estimate of the number of days remaining until the next refill may be required (e.g., 7 days). One way this may be computed is by dividing the volume of sustenance in the reservoir by the daily sustenance depletion rate averaged over some number of recent days. An alert icon 705 may be displayed to notify the user that the station will require service (e.g., refill, cleaning) within a specified time period (e.g., 7 days) to ensure an uninterrupted supply of sustenance to the flying animals. The "Purchase" hyperlink button 710 provides a convenient way for users to replenish their supply of sustenance, by opening a page through which they may order sustenance, station accessories, and related products and services. Sustenance station sensor data 707 and electrical load status 708 may be viewed by using a device's input means (e.g., mouse, stylus, finger) to select an individual sensor or load from the presented list (e.g., Feeder Temp, Wind Speed) for viewing its data or status. This example depicts a dashboard hyperlink 706 through which the user may navigate to a Dashboard 720 page (FIG. 7B) displaying real-time sensor data and load status, a Statistics hyperlink 711 to a Station Statistics 800 page (FIG. 8), and a Setup/Configuration hyperlink 712 to a Station Configuration Settings 900 page (FIG. 9). The status page 700 depicted in FIG. 7A is merely one example of how station status may be presented and not intended in any way to be limiting in the type, order, organization, layout, or amount of information presented. The information presented in the status page 700 is largely produced from data and status outputs of the sensors and loads that an embodiment comprises, as well as whatever information that may be further derived from them.

Figure 7B:
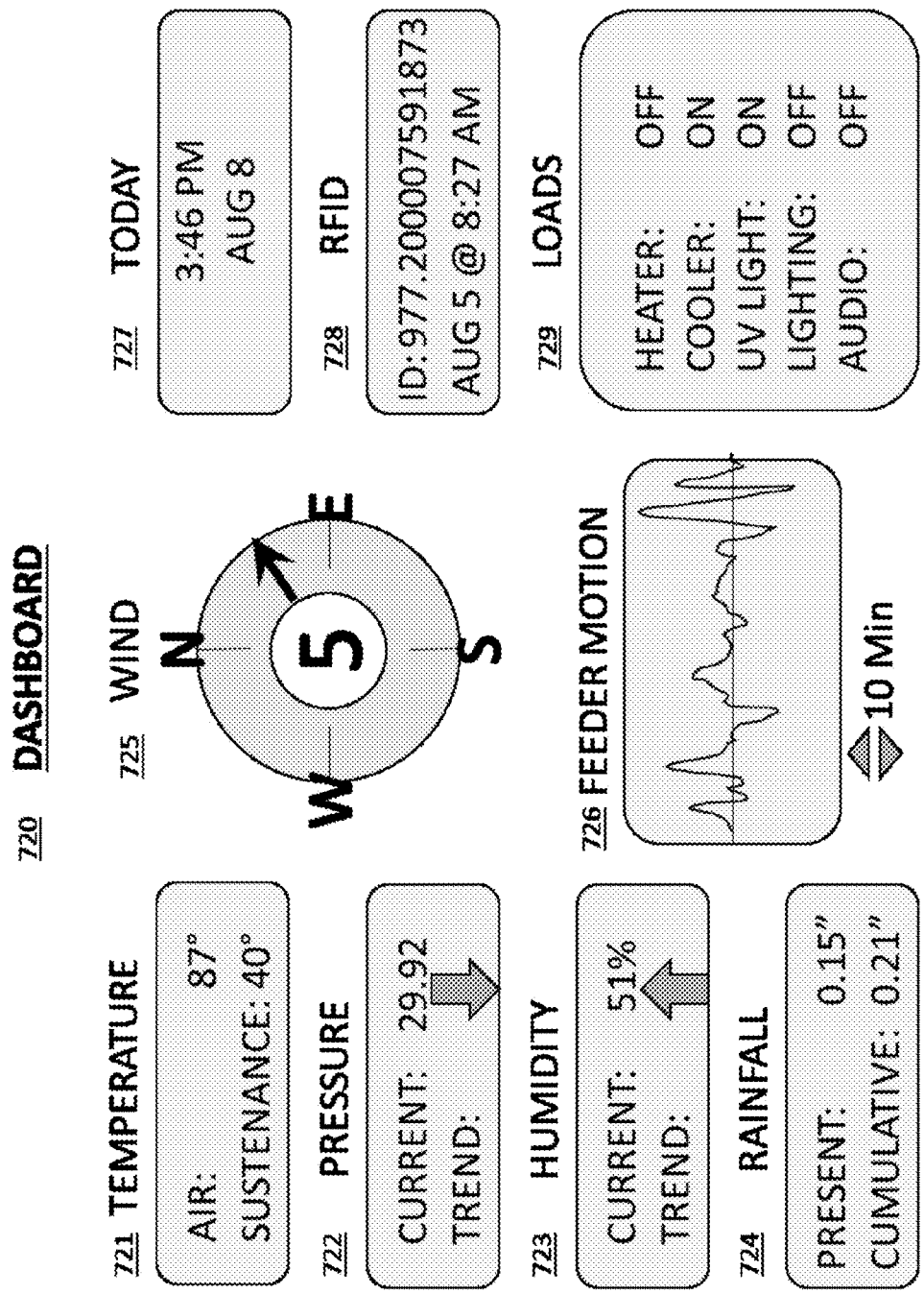
FIG. 7B depicts an example of a hummingbird feeder status dashboard.

FIG. 7B depicts an example of a sustenance station sensor data and load status dashboard 720. The Dashboard 720 page is intended to present data from sustenance station sensors in an easy-to-view format. For example, the air and sustenance temperature may be viewed together for comparison in the "TEMPERATURE" 721 window; the current barometric pressure and trend indication in the "PRESSURE" 722 window; the relative humidity and trend indication in the "HUMIDITY" 723 window; the present rain accumulation and cumulative amounts in the "RAINFALL" 724 window; the wind speed and direction in the "WIND" 725 graphic; the recent history of motion of the sustenance station over a selectable period of time in the "FEEDER MOTION" 726 window; the current date and time in the "TODAY" 727 window; the most recent RFID tag identification along with the time-stamp of the acquisition in the "RFID" 728 window; and the status of electrical loads as shown in the "LOADS" 729 window. In other embodiments of client or web applications, the Dashboard 720 page might be presented as the home page with more or less information displayed, and hyperlinks from which the other pages may be launched for user viewing and interaction.

FIG. 8 depicts an example of a Station Statistics page 800 presenting station status and bird activity statistical information. Information illustrated in this figure present the "TODAY" 801 window with today's date and time; the "BIRD VISITS" 802 window with counts of bird visits to the feeder for today, the past week, and the past 4 weeks; the "FOOD CONSUMPTION" 803 window with the percent of sustenance consumed today and the average daily consumption; and the "BIRDS VISIT HISTORY" 804 graph showing the number of birds that have visited the station daily over a period of time chosen through the "Select" widget 805. FIG. 8 presents but a small sampling of the wide variety of statistics that may be compiled for casual, amateur, and academic interest in flying animal behavioral and migration monitoring. Gathering and reporting statics associated with visits by flying animals carrying RFID tags may be of particular value to scientists monitoring specific animal populations that may be at risk. Statistical data compiled and presented by sustenance station applications is expected to vary widely and may be user-selectable and configurable according to the dictates of individual or academic interests.

FIG. 9 depicts an example of a system configuration UI under the page entitled "Station Configuration Settings" 900. In this example, a user may configure the settings for alerts 901, preferences 902, communications 903, and the station controller 904, as well as operational settings 905. The example of alerts 901 settings shown allow a user to configure the station to enable an alert to be generated when the food supply drops below a user-specified level, when the sustenance temperature is below or above separately specified temperatures, or when computing software determines that the sustenance supply may be nearing the point where it may be unsafe for consumption. The software determining the safety of the sustenance may be running on the station controller or on an external device, that tracks parameters related to the sustenance safety such as, for example: the time since the sustenance was last filled, the time the station was last cleaned, the temperature ranges to which the sustenance has been subjected, the use of UV purification, and other factors that affect the growth of harmful biological agents known to grow in the sustenance.

The preferences 902 configuration box shows an example of preferences a user might configure. These include an email address, a mobile phone number for text (SMS) message communication, and the current date and time setting. The communications 903 box shows an example of communication settings a user might configure to enable/disable radio communication using WiFi (IEEE 802.11), Bluetooth, or Cellular (e.g., CDMA LTE, GSM). Selecting a communication option (e.g., WiFi) opens up a configuration window (not shown) through which the user may configure specific settings (e.g., AP SSID), required and optional, that may be used by the controller to facilitate communication. The Controller 904 box shows an example of information about the station controller that may be displayed (e.g., model, software version), as well as a setting for enabling the automatic over-the-air (OTA) update of controller software. Other/additional information about the controller may be displayed and other/additional controller settings may be configured in other embodiments.

The operational settings 905 configuration box provides a UI through which sustenance station electrical loads may be enabled and configured, stations may be communicatively linked, and station data sharing may be configured. Embodiments of client and web applications may offer station owners the option to participate in scientific research on flying animals by allowing data collected by their station(s) to be shared with researchers. Operational settings 905 that may be enabled or configured in the example depicted are:

a) Cooling temperature—cool sustenance when temperature rises above specified setting.

b) Heating temperature—heat sustenance when temperature drops below specified setting.

c) Ultraviolet purifier—enable purifier operation.

d) Ambient lights—set 'on' and 'off' times.

e) Status lights—enable time and inhibit time.

f) Audio output—set 'on' and 'off' times; select playlist (e.g., water flowing sounds).

g) Camera 1—enable.

h) Camera 2—enable.

i) RFID—enable.

j) Configure communication with other station(s).

k) Order station parts & accessories—opens webpage catalog.

l) Station data sharing—configure data format and destination address for sending station data.

The number and type of configuration items depicted in boxes 901-905 in FIG. 9 are for descriptive purposes only and this, as well as other embodiments may support configuring more or fewer items than those listed in the each box, as well as more or fewer configuration settings boxes (categories) than those shown. Though not depicted for the sake of brevity, additional required or optional settings that may be associated with any entry within configuration item boxes (e.g., the WiFi settings of the communications 903 box discussed above) can be accommodated through a separate settings window associated with the entry, which opens via a hyperlink or pop-up when the entry is selected (for example).

Figure 10A:
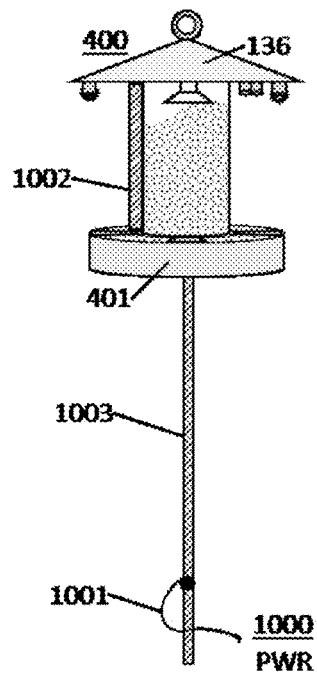
FIG. 10A depicts an example of solid-sustenance station power and signal routing for pole-mounting configuration.

FIG. 10A depicts an example of solid-sustenance station 400 power and signal routing for pole-mounting configuration. Power 1000 supplied from an external source is conducted through power wiring 1001 that is routed through a hole near the lower end of the station support pole 1003 upon which the solid sustenance station 400 is mounted. The power wiring 1001 is connected to the controller electronics within the feeding tray 401. Wiring conduit 1002 provides a protected means of routing power and signal wiring to electrical loads mounted on or integrated into the cap 136.

Figure 10B:
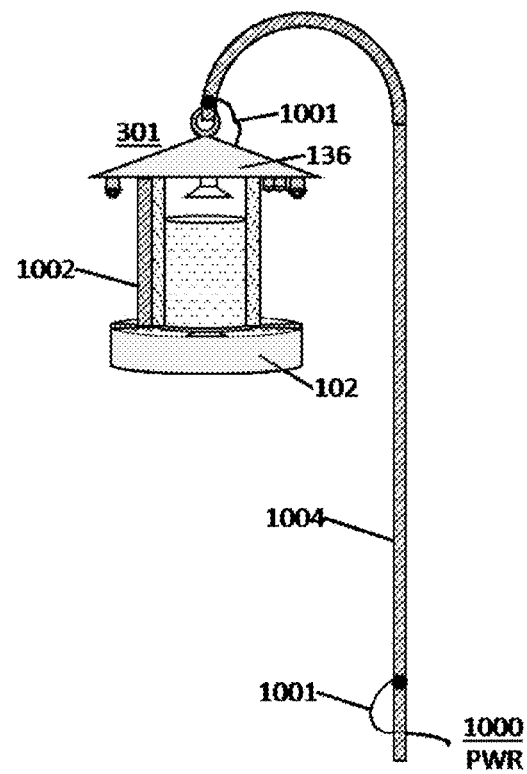
FIG. 10B depicts an example of liquid-sustenance station power and signal routing for configuration where the station is suspended from a pole.

FIG. 10B depicts an example of liquid-sustenance station 301 power and signal routing for configuration where station is suspended from pole. Power 1000 supplied from an external source is conducted through power wiring 1001 that is routed through a hole near the lower end of the station support pole 1004 from which the liquid sustenance station 301 is suspended. The power wiring 1001 is routed through a hole in the station cap 136 where it is connected to a power distribution and conditioning module supplying power to the controller electronics within the feeding tray 102 via wiring conduit 1002, which also provides a protected means of routing power and signal wiring to electrical loads mounted on or integrated into the cap 136.

Figure 10C:
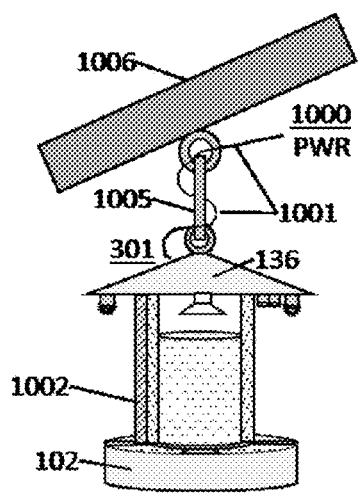
FIG. 10C depicts an example of liquid-sustenance station power and signal routing for a configuration where the station is suspended from an upper support.
Figure 10D:
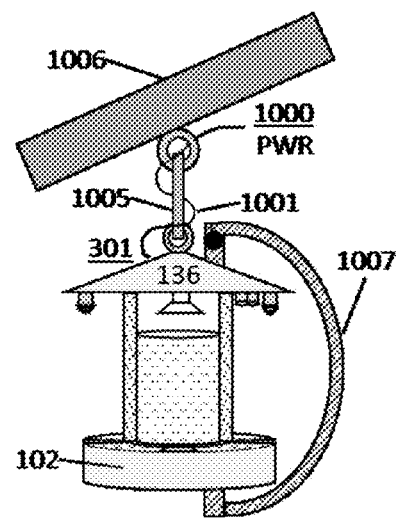
FIG. 10D depicts another example of liquid-sustenance station power and signal routing for a configuration where the station is suspended from an upper support.

FIG. 10C depicts an example of liquid-sustenance station 301 power and signal routing for configurations where the station is suspended from an upper support 1006 by some attachment means 1005 (e.g., cable, rope, hook, rod). Power 1000 supplied from an external source is conducted through power wiring 1001 that is routed through a hole in the station cap 136 where it is connected to a power distribution and conditioning module supplying power to the controller electronics within the feeding tray 102 via wiring conduit 1002, which also provides a protected means of routing power and signal wiring to electrical loads mounted on or integrated into the cap 136. FIG. 10D depicts another example of liquid-sustenance station 301 power and signal routing for configurations where the station is suspended from an upper support 1006 by some attachment means 1005 (e.g., cable, rope, hook, rod). In this example a bow-shaped conduit 1007 provides the protected means of routing power to the feeding tray 102, as well as power and signal wiring to electrical loads mounted on or integrated into the cap 136.

The different mounting configurations and station power connection designs shown are not intended to be limiting in how stations are mounted and power supplied to them. These are illustrative examples of how it can be accomplished but anyone skilled in the art would recognize many other ways of mounting and supplying power to sustenance stations.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles disclosed herein may be applied, it should be recognized that the illustrated embodiments are only preferred examples and should not be taken as limiting the scope of the disclosure. Rather, the scope of the disclosure is defined by the following claims. We therefore claim all that comes within the scope of these claims.

What is claimed is:

1. A powered, flying animal sustenance dispensing apparatus comprising:
    a storage vessel for storing liquid sustenance;
    a dispensing vessel removably attached to the storage vessel,
        the dispensing vessel having a capacity to hold some amount of the liquid sustenance,
        the dispensing vessel having one or more consumption stations configured such that animals can consume the liquid sustenance within the dispensing vessel, and
        the dispensing vessel automatically receiving additional amounts of the liquid sustenance from the storage vessel to replenish the liquid sustenance to the capacity;
    a temperature sensing component configured to sense the liquid sustenance temperature;
    a thermoelectric cooler (TEC) heat-exchangeably coupled to the liquid sustenance; and
    a controller receiving power from a power source, the controller comprising:
        one or more electrical inputs; and
        one or more electrical outputs;
    the temperature sensing component being communicatively coupled to at least one of the electrical inputs of the controller,
    the thermoelectric cooler (TEC) being communicatively coupled to at least one of the electrical outputs of the controller,
    whereby the controller applies power to the thermoelectric cooler (TEC) to cool the liquid sustenance when sensed liquid sustenance temperature is substantially equal to or above a first specified temperature.

2. The apparatus of claim 1 wherein the controller applies power to the thermoelectric cooler (TEC) to heat the liquid sustenance when sensed liquid sustenance temperature is substantially equal to or below a second specified temperature.

3. The apparatus of claim 1 further comprising one or more ultraviolet (UV) light sources optically coupled to the liquid sustenance and communicatively coupled to at least one of the electrical outputs of the controller,
    wherein the controller applies power continuously or intermittently to the UV light sources to sanitize the liquid sustenance.

4. The apparatus of claim 1 further comprising a level sensor configured for measuring the level of the liquid sustenance contained in the storage vessel or the dispensing vessel, and communicatively coupled to at least one of the electrical inputs of the controller.

5. The apparatus of claim 1 further comprising a resistive element heat-exchangeably coupled to the liquid sustenance and communicatively coupled to at least one of the electrical outputs of the controller,
    wherein the controller applies power to the thermoelectric cooler (TEC) or resistive element to heat the liquid sustenance when sensed liquid sustenance temperature is substantially equal to or below a second specified temperature.

6. The apparatus of claim 1 further comprising:
    a solid sustenance storage vessel for storing solid sustenance;
    a solid sustenance dispensing vessel removably, hingeably, or fixably attached to the solid sustenance storage vessel,
    the solid sustenance dispensing vessel having a solid sustenance capacity to hold some volume of the solid sustenance,
    the solid sustenance dispensing vessel having one or more solid sustenance consumption stations configured such that animals can consume the solid sustenance within the solid sustenance dispensing vessel, and
    the solid sustenance dispensing vessel automatically receiving additional the solid sustenance from the solid sustenance storage vessel to maintain the some volume of the solid sustenance in the solid sustenance dispensing vessel.

7. A powered, flying animal sustenance dispensing apparatus comprising:
    a storage vessel for storing sustenance;
    a dispensing vessel removably, hingeably, or fixedly attached to the storage vessel,
        the dispensing vessel having a capacity to hold some amount of the sustenance,
        the dispensing vessel having one or more consumption stations configured such that flying animals can consume the sustenance within the dispensing vessel, and
        the dispensing vessel automatically receiving additional amounts of the sustenance from the storage vessel to maintain the sustenance at the capacity;

a controller receiving power from a power source, the controller comprising:
  a processor;
  a memory for storing and retrieving data;
  one or more electrical inputs;
  one or more electrical outputs; and
  a bidirectional wireless communications component;
  whereby the processor is communicatively coupled to the memory, to the electrical inputs, to the electrical outputs, and to the bidirectional wireless communications component;
a level sensor configured to measure the level of the sustenance contained in the storage vessel or the dispensing vessel, and communicatively coupled to one of the electrical inputs of the controller;
whereby the controller is able to receive command, configuration, and update data wirelessly over the bidirectional wireless communications component,
whereby the controller is able to send status data, electrical input data, or electrical output state data wirelessly over the bidirectional wireless communications component, and
whereby the controller, under programmed control, controls the state of the electrical outputs responsive to data received from the electrical inputs or from the bidirectional wireless communications component.

8. The apparatus of claim 7 further comprising a visual indicator fixedly attached to the apparatus, and communicatively coupled to one of the electrical outputs of the controller, wherein the controller applies power to the visual indicator when the sustenance is at or below a specified level.

9. The apparatus of claim 7 wherein the sustenance is liquid and the apparatus further comprises a temperature sensing component configured to sense the liquid sustenance temperature, and communicatively coupled to at least one of the electrical inputs of the controller.

10. The apparatus of claim 9 further comprises
  a thermoelectric cooler (TEC) heat-exchangeably coupled to the liquid sustenance, and communicatively coupled to at least one of the electrical outputs of the controller,
  wherein the controller applies power to the thermoelectric cooler (TEC) to cool the liquid sustenance when sensed liquid sustenance temperature is substantially equal to or above a first specified temperature.

11. The apparatus of claim 10 wherein the controller applies power to the thermoelectric cooler (TEC) to heat the liquid sustenance when sensed liquid sustenance temperature is substantially equal to or below a second specified temperature.

12. The apparatus of claim 9 further comprising a resistive element heat-exchangeably coupled to the liquid sustenance and communicatively coupled to at least one of the electrical outputs of the controller,
  wherein the controller applies power to the thermoelectric cooler (TEC) or resistive element to heat the liquid sustenance when sensed liquid sustenance temperature is substantially equal to or below a second specified temperature.

13. The apparatus of claim 9 further comprising one or more ultraviolet (UV) light sources optically coupled to the liquid sustenance and communicatively coupled to at least one of the electrical outputs of the controller,
  wherein the controller applies power continuously or intermittently to the UV light sources to sanitize the liquid sustenance.

14. The apparatus of claim 7 further comprising one or more of the following:

an image sensor configured to capture still or moving images within the vicinity of the apparatus;
an audio sensor configured to receive sounds within the vicinity of the apparatus;
a motion sensor configured for measuring motion of the apparatus;
an RFID sensor configured for reading identification data from animals carrying wireless ID chips or tags;
a temperature sensor heat-exchangeably coupled to the air outside of the apparatus;
a barometric pressure sensor atmospherically coupled to the air outside of the apparatus;
a wind velocity sensor configured for measuring wind speed and direction in the vicinity of the apparatus;
a moisture sensor configured for measuring air humidity in the vicinity of the apparatus;
a rain accumulation sensor configured for measuring rainfall in the vicinity of the apparatus; and
wherein each sensor is communicatively coupled to at least one of the electrical inputs of the controller.

15. The apparatus of claim 7 further comprising one or more of the following electrical loads:
  a vibration generator vibrationally coupled to the apparatus;
  a solenoid actuator configured such that the solenoid rod strikes a surface of the apparatus when power is applied or removed;
  a loudspeaker for reproducing amplified audio signals; and
  wherein each electrical load is communicatively coupled to at least one of the electrical outputs of the controller.

16. The apparatus of claim 7 wherein the controller wirelessly transmits electrical input data or data containing the state of the one or more electrical outputs continuously, at scheduled intervals, or when the controller wirelessly receives a command to transmit the electrical input data or the electrical output state data.

17. The apparatus of claim 7 further comprising:
  a rechargeable electrical power storage component; and
  a power management component;
  wherein the power management component is electrically coupled to one or more power sources, to the apparatus, and to the rechargeable electrical power storage component;
  wherein the power management component supplies power to the rechargeable electrical power storage component, and to the apparatus when the one or more power sources are supplying power; and
  wherein the power management component supplies power from the rechargeable electrical power storage component to operate the apparatus when the one or more power sources are unable to supply sufficient power to operate the apparatus.

18. The apparatus of claim 7 wherein the sustenance is solid sustenance, and the apparatus further comprising:
  a liquid storage vessel for storing liquid sustenance;
  a liquid dispensing vessel removably attached to the liquid storage vessel,
    the liquid dispensing vessel having a liquid capacity to hold some amount of the liquid sustenance,
    the liquid dispensing vessel having one or more liquid consumption stations configured such that animals can consume the liquid sustenance within the liquid dispensing vessel, and
    the liquid dispensing vessel automatically receiving additional amounts of the liquid sustenance from the liquid storage vessel to replenish the liquid sustenance to the liquid capacity;

a temperature sensing component configured to sense the liquid sustenance temperature, the temperature sensing component being communicatively coupled to one of the electrical inputs of the controller;

a thermoelectric cooler (TEC) heat-exchangeably coupled to the liquid sustenance, and communicatively coupled to one or more electrical outputs of the controller; and wherein the controller applies power to the thermoelectric cooler (TEC) to cool the liquid sustenance when sensed liquid sustenance temperature substantially equals or exceeds a first specified temperature.

19. The apparatus of claim 18 wherein the controller applies power to the thermoelectric cooler (TEC) to heat the liquid sustenance when sensed liquid sustenance temperature is substantially equal to or below a second specified temperature.

20. The apparatus of claim 18 further comprising a resistive element heat-exchangeably coupled to the liquid sustenance and communicatively coupled to at least one of the electrical outputs of the controller, wherein the controller applies power to the thermoelectric cooler (TEC) or resistive element to heat the liquid sustenance when sensed liquid sustenance temperature is substantially equal to or below a second specified temperature.

* * * * *